(12) United States Patent
Sanchez

(10) Patent No.: US 11,853,030 B2
(45) Date of Patent: Dec. 26, 2023

(54) SOFT SMART RING AND METHOD OF MANUFACTURE

(71) Applicant: BlueOwl, LLC, San Francisco, CA (US)

(72) Inventor: Kenneth Jason Sanchez, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 326 days.

(21) Appl. No.: 16/927,394

(22) Filed: Jul. 13, 2020

(65) Prior Publication Data
US 2023/0205170 A1 Jun. 29, 2023

Related U.S. Application Data

(60) Provisional application No. 62/988,065, filed on Mar. 11, 2020, provisional application No. 62/877,391, filed on Jul. 23, 2019.

(51) Int. Cl.
*G05B 19/4099* (2006.01)
*B29C 64/20* (2017.01)
(Continued)

(52) U.S. Cl.
CPC .......... *G05B 19/4099* (2013.01); *B29C 64/10* (2017.08); *B29C 64/20* (2017.08);
(Continued)

(58) Field of Classification Search
CPC ...... G05B 19/4099; G05B 2219/49007; B29C 64/10; B29C 64/20; B29C 64/393;
(Continued)

(56) References Cited

U.S. PATENT DOCUMENTS 6,097,480 A 8/2000 Kaplan
6,154,658 A 11/2000 Caci
(Continued)

FOREIGN PATENT DOCUMENTS

CN 104799509 A 7/2015
CN 105841851 A * 8/2016 ............... G01L 1/22
(Continued)

OTHER PUBLICATIONS https://en.wikipedia.org/w/index.php?title=Ring_size&oldid=891328817 (Year: 2019).
(Continued)

*Primary Examiner* — Yuhui R Pan
(74) *Attorney, Agent, or Firm* — BRYAN CAVE LEIGHTON PAISNER LLP

(57) ABSTRACT

A smart ring includes a body including flexible material, a first part, a second part removably connected to the first part, and at least one pair of break-away portions disposed within the body separate from the first part and the second part. One or more of a battery, a charging unit, a processor unit, a user input unit, a communication unit, a memory unit, at least one sensor unit, an output unit or a user input unit is disposed in or on one of the first part and the second part. Each of the break-away portions of the pair of break-away portions is removable from the other break-away portion upon movement of one break-away portion in a direction away from the other break-away portion.

20 Claims, 9 Drawing Sheets

(51) Int. Cl.

| | |
|---|---|
| *B29C 64/10* | (2017.01) |
| *B29C 64/393* | (2017.01) |
| *B33Y 50/02* | (2015.01) |
| *B33Y 30/00* | (2015.01) |
| *B33Y 10/00* | (2015.01) |
| *B33Y 80/00* | (2015.01) |
| *A44C 9/00* | (2006.01) |
| *B29L 31/00* | (2006.01) |

(52) U.S. Cl.
CPC ............ *B29C 64/393* (2017.08); *B33Y 10/00* (2014.12); *B33Y 30/00* (2014.12); *B33Y 50/02* (2014.12); *B33Y 80/00* (2014.12); *A44C 9/0053* (2013.01); *B29L 2031/7096* (2013.01); *G05B 2219/49007* (2013.01)

(58) Field of Classification Search
CPC ......... B33Y 10/00; B33Y 30/00; B33Y 50/02; B33Y 80/00; A44C 9/0053; B29L 2031/7096

See application file for complete search history.

(56) References Cited

U.S. PATENT DOCUMENTS

| | | | |
|---|---|---|---|
| 6,560,993 | B1 | 5/2003 | Bosque et al. |
| 7,013,674 | B2 | 3/2006 | Kretchmer |
| 7,500,746 | B1 | 3/2009 | Howell et al. |
| 7,872,444 | B2 | 1/2011 | Hamilton et al. |
| 8,075,484 | B2 | 12/2011 | Moore-Ede |
| 8,446,275 | B2 | 5/2013 | Utter, II |
| 8,570,273 | B1 | 10/2013 | Smith |
| 9,248,839 | B1 | 2/2016 | Tan |
| 9,362,775 | B1 | 6/2016 | Jacobs |
| 9,420,260 | B2 | 8/2016 | McGregor et al. |
| 9,440,657 | B1 | 9/2016 | Fields et al. |
| 9,477,146 | B2 | 10/2016 | Xu et al. |
| 9,509,170 | B2 | 11/2016 | Wu |
| 9,628,707 | B2 | 4/2017 | Blum et al. |
| 9,660,488 | B2 | 5/2017 | Breedvelt-Schouten et al. |
| 9,696,690 | B2 | 7/2017 | Nguyen et al. |
| 9,711,060 | B1 | 7/2017 | Lusted et al. |
| 9,711,993 | B2 | 7/2017 | Kim |
| 9,717,949 | B1 | 8/2017 | Tran et al. |
| 9,756,301 | B2 | 9/2017 | Li et al. |
| 9,847,020 | B2 | 12/2017 | Davis |
| 9,861,314 | B2 | 1/2018 | Haverinen et al. |
| 9,908,530 | B1 | 3/2018 | Fields et al. |
| 9,955,286 | B2 | 4/2018 | Segal |
| 9,956,963 | B2 | 5/2018 | Vijaya Kumar et al. |
| 9,965,761 | B2 | 5/2018 | Elangovan et al. |
| 10,007,355 | B2 | 6/2018 | Schorsch et al. |
| 10,085,695 | B2 | 10/2018 | Ouwerkerk et al. |
| 10,099,608 | B2 | 10/2018 | Cuddihy et al. |
| 10,102,510 | B2 | 10/2018 | Yau et al. |
| 10,137,777 | B2 | 11/2018 | Lu et al. |
| 10,315,557 | B2 | 6/2019 | Terwilliger et al. |
| 10,317,940 | B2 | 6/2019 | Eim et al. |
| 10,359,846 | B2 | 7/2019 | Priyantha et al. |
| 10,366,220 | B2 | 7/2019 | Shapiro et al. |
| 10,396,584 | B2 | 8/2019 | Madau et al. |
| 10,409,327 | B2 | 9/2019 | Stotler |
| 10,444,834 | B2 | 10/2019 | Vescovi et al. |
| 10,463,141 | B2 | 11/2019 | Fitzgerald et al. |
| 10,629,175 | B2 | 4/2020 | Yan et al. |
| 10,664,842 | B1 | 5/2020 | Bermudez et al. |
| 10,693,872 | B1 | 6/2020 | Larson et al. |
| 10,703,204 | B2 | 7/2020 | Hassan et al. |
| 10,745,032 | B2 | 8/2020 | Scheggi |
| 11,227,060 | B1 | 1/2022 | John et al. |
| 11,312,299 | B1 | 4/2022 | Assam |
| 11,479,258 | B1 | 10/2022 | Sanchez |
| 11,637,511 | B2 | 4/2023 | Sanchez |
| 2002/0121831 | A1 | 9/2002 | Egawa et al. |
| 2004/0200235 | A1* | 10/2004 | Kretchmer ........... A44C 5/0092 63/3 |
| 2005/0054941 | A1 | 3/2005 | Ting et al. |
| 2005/0230596 | A1 | 10/2005 | Howell et al. |
| 2006/0250043 | A1 | 11/2006 | Chung |
| 2008/0068559 | A1 | 3/2008 | Howell et al. |
| 2008/0218684 | A1 | 9/2008 | Howell et al. |
| 2008/0275309 | A1 | 11/2008 | Stivoric et al. |
| 2011/0007035 | A1 | 1/2011 | Shai |
| 2012/0184367 | A1 | 7/2012 | Parrott et al. |
| 2013/0335213 | A1 | 12/2013 | Sherony et al. |
| 2014/0107493 | A1 | 4/2014 | Yuen et al. |
| 2014/0118704 | A1 | 5/2014 | Duelli et al. |
| 2014/0120983 | A1 | 5/2014 | Lam |
| 2014/0218529 | A1 | 8/2014 | Mahmoud et al. |
| 2014/0238153 | A1* | 8/2014 | Wood .................. A43B 23/029 73/862.627 |
| 2014/0240132 | A1 | 8/2014 | Bychkov |
| 2014/0309849 | A1 | 10/2014 | Ricci |
| 2015/0003693 | A1 | 1/2015 | Baca et al. |
| 2015/0019266 | A1 | 1/2015 | Stempora |
| 2015/0046996 | A1 | 2/2015 | Slaby et al. |
| 2015/0062086 | A1 | 3/2015 | Nattukallingal |
| 2015/0065090 | A1 | 3/2015 | Yeh |
| 2015/0124096 | A1 | 5/2015 | Koravadi |
| 2015/0126824 | A1 | 5/2015 | Leboeuf et al. |
| 2015/0158499 | A1 | 6/2015 | Koravadi |
| 2015/0220109 | A1 | 8/2015 | Von et al. |
| 2015/0277559 | A1 | 10/2015 | Vescovi et al. |
| 2015/0338926 | A1 | 11/2015 | Park et al. |
| 2015/0352953 | A1 | 12/2015 | Koravadi |
| 2016/0028267 | A1 | 1/2016 | Lee et al. |
| 2016/0098530 | A1 | 4/2016 | Dill et al. |
| 2016/0226313 | A1 | 8/2016 | Okubo |
| 2016/0236692 | A1 | 8/2016 | Kleen et al. |
| 2016/0292563 | A1 | 10/2016 | Park |
| 2016/0317060 | A1 | 11/2016 | Connor |
| 2016/0334901 | A1 | 11/2016 | Rihn |
| 2016/0336758 | A1* | 11/2016 | Breedvelt-Schouten ................... H02J 50/12 |
| 2016/0361032 | A1 | 12/2016 | Carter et al. |
| 2017/0010677 | A1 | 1/2017 | Roh et al. |
| 2017/0012925 | A1 | 1/2017 | Tekin et al. |
| 2017/0024008 | A1 | 1/2017 | Kienzle et al. |
| 2017/0026790 | A1 | 1/2017 | Flitsch et al. |
| 2017/0042477 | A1* | 2/2017 | Haverinen ........... A61B 5/6826 |
| 2017/0053461 | A1 | 2/2017 | Pal et al. |
| 2017/0057492 | A1 | 3/2017 | Edgington et al. |
| 2017/0070078 | A1 | 3/2017 | Hwang et al. |
| 2017/0075701 | A1 | 3/2017 | Ricci et al. |
| 2017/0080952 | A1 | 3/2017 | Gupta et al. |
| 2017/0090475 | A1 | 3/2017 | Choi et al. |
| 2017/0109512 | A1 | 4/2017 | Bower et al. |
| 2017/0129335 | A1 | 5/2017 | Lu et al. |
| 2017/0131772 | A1 | 5/2017 | Choi |
| 2017/0190121 | A1* | 7/2017 | Aggarwal .............. A43D 1/025 |
| 2017/0242428 | A1 | 8/2017 | Pal et al. |
| 2017/0346635 | A1 | 11/2017 | Gummeson et al. |
| 2017/0347895 | A1 | 12/2017 | Wei et al. |
| 2017/0374074 | A1 | 12/2017 | Stuntebeck |
| 2018/0025351 | A1 | 1/2018 | Chen et al. |
| 2018/0025430 | A1 | 1/2018 | Perl et al. |
| 2018/0032126 | A1 | 2/2018 | Liu |
| 2018/0037228 | A1 | 2/2018 | Biondo et al. |
| 2018/0039303 | A1 | 2/2018 | Hashimoto et al. |
| 2018/0052428 | A1 | 2/2018 | Abramov |
| 2018/0054513 | A1 | 2/2018 | Ma |
| 2018/0068105 | A1 | 3/2018 | Shapiro et al. |
| 2018/0093606 | A1 | 4/2018 | Terwilliger et al. |
| 2018/0093672 | A1 | 4/2018 | Terwilliger et al. |
| 2018/0115797 | A1 | 4/2018 | Wexler et al. |
| 2018/0120892 | A1 | 5/2018 | Von et al. |
| 2018/0123629 | A1 | 5/2018 | Wetzig |
| 2018/0167200 | A1 | 6/2018 | High et al. |
| 2018/0174457 | A1 | 6/2018 | Taylor |
| 2018/0292901 | A1 | 10/2018 | Priyantha et al. |
| 2018/0300467 | A1 | 10/2018 | Kwong et al. |
| 2018/0322957 | A1 | 11/2018 | Dill et al. |
| 2019/0049267 | A1 | 2/2019 | Huang |

(56) References Cited

U.S. PATENT DOCUMENTS

| | | |
|---|---|---|
| 2019/0083022 A1 | 3/2019 | Huang |
| 2019/0131812 A1 | 5/2019 | Lee et al. |
| 2019/0155104 A1 | 5/2019 | Li et al. |
| 2019/0155385 A1* | 5/2019 | Lim .................. G06F 3/033 |
| 2019/0191998 A1 | 6/2019 | Heikenfeld et al. |
| 2019/0230507 A1 | 7/2019 | Li et al. |
| 2019/0265868 A1 | 8/2019 | Penilla et al. |
| 2019/0286805 A1 | 9/2019 | Law et al. |
| 2019/0287083 A1 | 9/2019 | Wurmfeld et al. |
| 2019/0298173 A1 | 10/2019 | Lawrence et al. |
| 2019/0332140 A1 | 10/2019 | Wang et al. |
| 2019/0342329 A1 | 11/2019 | Turgeman |
| 2019/0357834 A1 | 11/2019 | Aarts et al. |
| 2020/0005791 A1 | 1/2020 | Rakshit et al. |
| 2020/0070840 A1 | 3/2020 | Gunaratne |
| 2020/0218238 A1 | 7/2020 | Wang |
| 2020/0356652 A1 | 11/2020 | Yamaguchi et al. |
| 2020/0391696 A1 | 12/2020 | Kato et al. |
| 2021/0019731 A1 | 1/2021 | Rule et al. |
| 2021/0029112 A1 | 1/2021 | Palle et al. |
| 2021/0197849 A1 | 7/2021 | Tsuji |
| 2021/0382684 A1 | 12/2021 | Hachiya et al. |
| 2022/0083149 A1 | 3/2022 | Keller et al. |

FOREIGN PATENT DOCUMENTS

| | | | |
|---|---|---|---|
| CN | 106360895 A | | 2/2017 |
| CN | 206213423 U | * | 6/2017 |
| CN | 206333477 U | | 7/2017 |
| CN | 206371611 U | | 8/2017 |
| CN | 107139933 A | | 9/2017 |
| CN | 107260139 A | | 10/2017 |
| CN | 108900691 A | | 11/2018 |
| CN | 108926081 A | | 12/2018 |
| CN | 108926081 A | * | 12/2018 |
| DE | 102015006677 A1 | | 11/2016 |
| DE | 102019116618 A1 | | 12/2020 |
| EP | 2581856 A1 | | 4/2013 |
| KR | 10-2017-0087113 A | | 7/2017 |
| WO | 2015/077418 A1 | | 5/2015 |
| WO | 2017/136940 A1 | | 8/2017 |
| WO | 2018/154341 A1 | | 8/2018 |
| WO | 2018/204811 A1 | | 11/2018 |
| WO | 2019/082095 A1 | | 5/2019 |
| WO | 2019/140528 A1 | | 7/2019 |
| WO | 2019/180626 A1 | | 9/2019 |

OTHER PUBLICATIONS

Mario, https://www.smartringnews.com/posts/smart-ring-vs-smartwatch-which-is-the-best-fitness-and-activity-tracker (Year: 2014).

Adafruit, p. 1-2, available at: https://www.adafruit.com/product/2806, published Jun. 2019 (Year: 2019).

Laput et al., "Skin buttons: cheap, small, low-powered and clickable fixed-icon laser projectors", UIST '14: Proceedings of the 27th annual ACM symposium on User interface software and technology, Oct. 2014 pp. 389-394.

"How to find your ideal bedtime with the Oura app", available online at <https://web.archive.org/web/20191206205332/https://ouraring.com/how-to-find-your-ideal-bedtime-with-the-oura-app/>, 2019, 8 pages.

"Vauxhall/Opel In-Car Wireless Charging", retrieved from <https://www.air-charge.com/aircharge-for-business/automotive/vauxhall-wireless-charging>, Oct. 2019, 4 pages.

"Wireless charging for smart ring/pointing devices" available online at <http://www.humavox.com/smt_product/wireless-charging-for-smart-ringpointing-devices/>, Oct. 2019, 3 pages.

ASU projection wearable: Live tomorrow today (world first launch @ CES 2016). (Dec. 2015). ASU Tech, YouTube. Retrieved from https://www.youtube.com/watch?v=Wdb5O-D7Y0Y.

Brownell, L., "Low-cost wearables manufactured by hybrid 3D printing. Wyss Institute, Harvard," Retrieved from https://wyss.harvard.edu/news/low-cost-wearables-manufactured-by-hybrid-3d-printing/, Sep. 6, 2017, pp. 11.

Cetin, C., "Design, testing and implementation of a new authentication method using multiple devices," Graduate Theses and Dissertations, University of South Florida Scholar Commons. Retrieved from http://scholarcommons.usf.edu/etd/5660, Jan. 2015, pp. 61.

Charles Q. Choi, "Low Battery? New Tech Lets You Wirelessly Share Power", available online at <https://www.livescience.com/54790-new-tech-enables-wireless-charging.html>, May 19, 2016, 9 pages.

Chen, X. A., et al., "Encore: 3D printed augmentation of everyday objects with printed-over, affixed and interlocked attachments," Nov. 5, 2015, pp. 73-82.

Chen, X. A., et al., "Reprise: A design tool for specifying, generating, and customizing 3D printable adaptations on everyday objects," Oct. 16, 2016, pp. 29-39.

E-Senses, "Personal vitamin D, sunlight and daylight coach", available online at <https://e-senses.com/>, 2019, 5 pages.

Hipolite, W., "The 3D printed Ö Bluetooth Ring is one of the tiniest personal computers you will ever see," 3DPrint.com. Retrieved from https://3dprint.com/34627/o-bluetooth-ring-3d-printed/, Jan. 2015, pp. 5.

Hussain Almossawi, "This smart ring aims to provide better lives for people with sickle cell disease", retrieved from <https://www.core77.com/projects/82131/This-Smart-Ring-Aims-to-Provide-Better-Lives-for-People-with-Sickle-Cell-Disease>, 2021, 9 pages.

Je et al., "PokeRing: Notifications by poking around the finger", Proceedings of the 2018 CHI Conference on Human Factors in Computing Systems—CHI'18, 2018, paper 542, pp. 1-10.

Katharine Schwab, "Orii, the ring that turns your finger into a phone, is here", available online at <https://www.fastcompany.com/90399237/orii-the-ring-that-turns-your-finger-into-a-phone-is-here >, 2019, 4 pages.

Magno et al., "Self-sustainable smart ring for long-term monitoring of blood oxygenation", IEEE Access, 2019, pp. 115400-115408.

Mahmud et al., "Wearable technology for drug abuse detection: A survey of recent advancements", Smart Health, vol. 13, Aug. 2019, 100062.

Margaret, "The Orb: A Bluetooth headset that turns into a ring", Gadgets, BornRich, Jun. 2013, available online at <http://www.bornrich.com/the-orb-a-bluetooth-headset-that-turns-into-a-ring.html >.

Nassi et al., "Virtual breathalyzer", Department of Software and Information Systems Engineering, Ben-Gurion University of the Negev, Israel, 2016, 10 pages.

Neev Kiran, "SkinnySensor: Enabling Battery-Less Wearable Sensors Via Intrabody Power Transfer", Masters Theses 694, University of Massachusetts Amherst, 2018, 63 pages.

Nerd-Fu, "Push present", Delicious Juice Dot Com, Apr. 2015, available online at <https://blog.deliciousjuice.com/2015/04/ >.

Pablo E Suárez, "NXT Ring—Your Digital-self at Hand", available online at <https://www.youtube.com/watch?v=9w7uxDHs7NY>, uploaded on Jun. 21, 2019, 2 pages.

Roumen et al., "NotiRing: A comparative study of notification channels for wearable interactive rings", Proceedings of the 33rd Annual ACM Conference on Human Factors in Computing Systems—CHI'15, 2015, pp. 2497-2500.

Sarah Jacobsson Purewal, "Ringly review: The smart ring that could be sexier", available online at <https://www.macworld.com/article/227133/ringly-review-the-smart-ring-that-could-be-sexier.html>, 2016, 10 pages.

Schwab, K., "This startup wants to kill passwords—and replace them with jewelry. Fast Company, " Retrieved from https://www.fastcompany.com/90254843/this-startup-wants-to-kill-passwords-and-replace-them-with-jewelry, (Oct. 2018), pp. 7.

Seung et al., "Nanopatterned Textile-Based Wearable Triboelectric Nanogenerator", ACS Nano, vol. 9, 2015, pp. 3501-3509.

Shane McGlaun, "Geek builds Bluetooth Smart Ring with OLED display", available online at <https://www.slashgear.com/geek-builds-bluetooth-smart-ring-with-oled-display-02361383/>, 2015, 6 pages.

Sperlazza, "We tested four sleep tracker apps and wearables: Here are the best ones", available online at <https://www.bulletproof.com/sleep/tech/best-sleep-tracker-apps/>, 2019, 18 pages.

(56) References Cited

OTHER PUBLICATIONS

Turunen, "Smart ring for stress control and self-understanding", available online at <https://slowfinland.fi/en/smart-ring-for-stress-control-and-self-understanding/>, 2017, 9 pages.

Wochit Tech. (2017). New smart ring monitors UV exposure [Video file]. Retrieved from https://www.youtube.com/watch?v=4YvkioTZxjU, 3 pages.

Worgan et al., "Garment level power distribution for wearables using inductive power transfer", 9th International Conference on Human System Interactions (HSI), 2016, pp. 277-283.

Xiao et al., "LumiWatch: On-arm projected graphics and touch input", Proceedings of the 2018 CHI Conference on Human Factors in Computing Systems—CHI'18, 2018, pp. 1-11.

Zhu et al., "Developing a driving fatigue detection system using physiological sensors", Proceedings of the 29th Australian Conference on Computer-Human Interaction—OZCHI '17, 2017, pp. 566-570.

Zhu, M. et al. "Fluidic fabric muscle sheets for wearable and soft robotics," Retrieved from https://arxiv.org/pdf/1903.08253.pdf, Mar. 2019, pp. 32.

Google translation of KR20170087113A (Year: 2016).

Adafruit.com, "RFID/NFC Smart Ring—Size 12—NTAG213", Accessed at: https://web.archive.org/web/20190605061438/https://www.adafruit.com/product/2806, publication Jun. 5, 2019 (Year: 2019).

\* cited by examiner

SOFT SMART RING AND METHOD OF MANUFACTURE

CROSS-REFERENCES TO RELATED APPLICATIONS

This application claims priority to U.S. Provisional Patent Application No. 62/877,391, filed Jul. 23, 2019, and U.S. Provisional Patent Application No. 62/988,065, filed Mar. 11, 2020, both incorporated by reference herein for all purposes.

FIELD OF THE DISCLOSURE

The present disclosure generally relates to implementations of smart ring wearable devices.

BACKGROUND

To the extent that smart ring technology has been adopted, it has a number of challenges. Problems with wearable rings include: they generally need to be removed for charging; they have poor fit; they provide relatively little interactivity; and they provide limited functionality, in general.

BRIEF SUMMARY

This disclosure describes a number of improvements to smart ring technology. Specifically, this disclosure describes multiple techniques for charging smart rings (including harvesting energy, improving wireless charging, improving battery configurations, and increasing functionality while maintaining substantively low energy consumption).

Further, the described techniques include: techniques for measuring and analyzing biometrics; techniques for enabling a variety of security features using smart rings; techniques for improving smart ring form factors; and techniques for using gesture recognition and improving interactivity of smart rings.

According to one aspect of the present disclosure, a smart ring comprises a body including flexible material, a first part, a second part removably connected to the first part, and a pair of break-away portions disposed within the body separate from the first part and the second part. One or more of a battery, a charging unit, a processor unit, a user input unit, a communication unit, a memory unit, at least one sensor unit, an output unit or a user input unit is disposed in or on one of the first part and the second part. So configured, each of the break-away portions of the pair of break-away portions is removable from the other break-away portion upon movement of one break-away portion in a direction away from the other break-away portion.

According to another aspect of the present disclosure, a method of manufacturing a smart ring comprises creating a first part of a body with a flexible material by one of heat molding, stamping, chemical or laser etching, injection molding, ink printing, metal forming, machining or additive manufacturing, and creating a second part of the body with a flexible material by one of heat molding, stamping, chemical or laser etching, injection molding, ink printing, metal forming, machining or additive manufacturing and coupling the second part of the body to the first part of the body. The method also includes providing a pair of magnetic break-away portions separate from the first part and the second part and coupling the pair of magnetic break-away portions to one or more of the first body part and the second body part, such that the pair of magnetic break-away portions couple the second part of the body to the first part of the body. The method still further includes disposing one or more of a battery, a charging unit, a processor unit, a user input unit, a communication unit, a memory unit, at least one sensor unit, an output unit or a user input unit disposed in or on one of the first part of the body, the second part of the body, or a housing coupled to the body.

According to yet another aspect of the present disclosure, a system for additively manufacturing a smart ring comprises a communication network, and a scanning device communicatively coupled to the communication network. The scanning device includes a memory and at least one processor, at least one processor of the scanning device executing a scanning module stored on the memory of the scanning device to create a user-specific scan. The system further comprises a 3D printer communicatively coupled to the communication network, and a design system having a computing device communicatively coupled to the communication network, the scanning device, and the 3D printer. The computing device of the design system may have a memory, at least one processor, a transmitter, and a receiver. The computing device may receive data from the scanning device relating to the user-specific scan. A module is stored in the memory of the computing device of the design system and executable by the at least one processor of the computing device of the design system to: (1) receive data from the scanning device relating to the user-specific scan; and (2) create a user-specific smart ring profile based at least in part on the data received from the scanning device, the user-specific smart ring profile adapted to be transmitted to the 3D printer to implement the user-specific smart ring profile. So configured, the scanning device creates the user-specific scan and the 3D printer receives the user-specific smart ring profile from the computing device of the design center and implements the user-specific smart ring profile to additively manufacture a smart ring comprising a body including flexible material, a first part, a second part removably connected to the first part, and a pair of break-away portions disposed in the body separate from the first part and the second part.

In further accordance with any one or more of the exemplary aspects, the method of manufacturing a smart ring, the system for additively manufacturing a smart ring or any other method or system of the present disclosure may include any one or more of the following preferred forms and/or methods.

According to one form, the body of the smart ring may comprise an inside surface adapted to contact a finger of a user during use. The inside surface may have one or more of at least one sensor or at least one output element.

According to another form, one or more of a portion of the body or the entire body may comprise an electric sensor fabric material.

According to yet another form, a portion of the body may include a silicone material adapted to function as part of one of an artificial muscle or a nerve. The silicone material may be configured to one or more of generating electricity or sensing pressure.

In another form, the body may further comprise an outside surface having one or more of at least one sensor or at least one output element.

In yet another form, the pair of break-away portions may comprise a pair of magnetic break-away portions, and the magnetic break-away portions may include a first magnetic break-away portion and a second magnetic break-away portion disposed adjacent to and in contact with each other. The first magnetic break-away portion may be attached to the first body and include a magnet. The second magnetic break-away portion may be attached to the second part and include a magnet. The magnets may secure the first and second magnetic break-away portions and be removable from each other upon movement of the first magnetic break-away portion in a direction away from the second magnetic break-away portion.

In still another form, the body may be one or more of additively manufactured, injection molded, stamped, ink printed, metal formed, machined or heat molded to a user's dimensions obtained by one or more of scanning or photographing a portion of the user's hand or a mold indicative of a user's finger dimensions, for example In another form, the smart ring may further comprise a housing, wherein one or more of the battery, the charging unit, the processing unit, the user input unit, the communication unit, the memory unit, the at least one sensor unit, and the output unit may be disposed within the housing, and the body may be coupled to the housing.

According to another form, the smart ring may further comprise an output device separate from and coupled to the body. The output device may include one or more of an LCD display, an OLED display, e-ink displays, one or more LED pixels, or a speaker.

In still another form, the first part of the body may be a front part of the body including one recess, and the second part of the body may be a rear part of the body including one tab adapted to be disposed within the at least one recess when the first body part and the second body part are connected to each other. In addition, the first magnetic break-away portion may be disposed adjacent to the recess and the second magnetic break-away portion may be disposed on or attached to the tab. So configured, the first and second magnetic break-away portions may be adjacent to each other when the at least one tab is disposed within the at least one recess.

In yet another form, the first part of the body may be a top body part, and the second part of the body may be a bottom body part. Further, the first magnetic break-away portion may be attached to the top body part, and the second magnetic break-away portion may be attached to the bottom body part. So configured, the first and second magnetic break-away portions may be adjacent to and in contact with each other when the bottom body part is connected to the top body part.

According to yet another example, the method may further comprise coupling a housing to the additively manufactured body of the smart ring, the housing including one or more of a battery, a charging unit, a processor unit, a user input unit, a communication unit, a memory unit, at least one sensor unit, an output unit or a user input unit disposed in or on the body.

In another example, the method may comprise disposing one or more of at least one sensor or an output element on an inside surface of the body.

In yet another exemplary method, the method may further comprise disposing one or more of at least one sensor or an output element on an outside surface of the body.

In another example, the method may further comprise disposing an output device separate from the body on a portion of the body of the smart ring.

In another form, the scanning device may further comprise a transmitter and a receiver. The transmitter may transmit the scanning data to the computing device of the design center.

In yet another form, the 3D printer may have a memory, at least one processor, a transmitter and a receiver. The receiver of the 3D printer may receive the user-specific smart ring profile from the computing device of the design center. The at least one processor of the 3D printer may execute the user-specific smart ring profile to additively manufacture the body of the smart ring.

In another form, the scanning device may include a volumetric capture sensor.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

Figure 1:
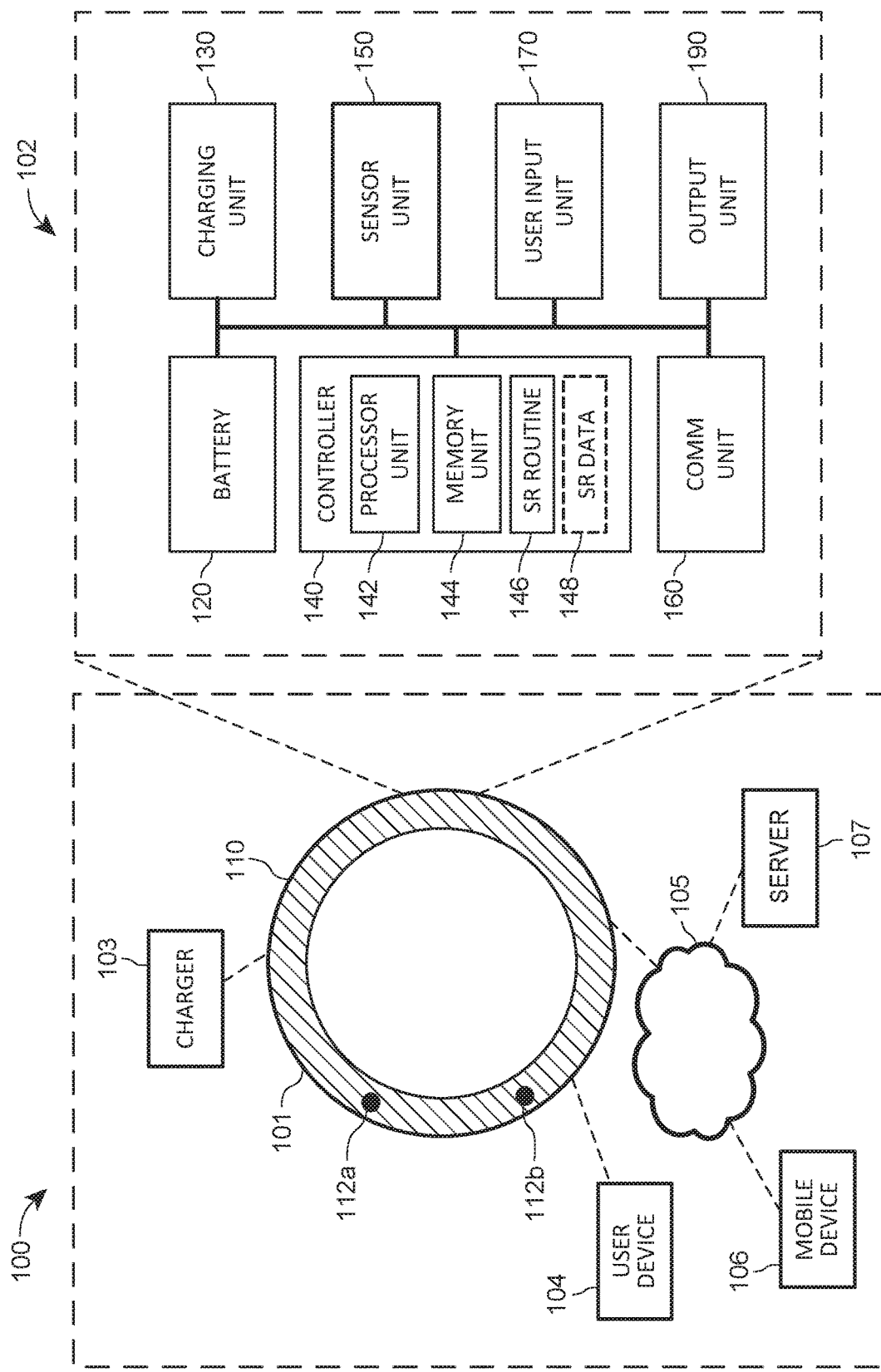
FIG. 1 illustrates a system comprising a smart ring and a block diagram of smart ring components according to some embodiments.

FIG. 1 illustrates a system 100 comprising (i) a smart ring 101 including a set of components 102 and (ii) one or more devices or systems that may be electrically, mechanically, or communicatively connected to the smart ring 101. Specifically, the system 100 may comprise any one or more of: a charger 103 for the smart ring 101, a user device 104, a network 105, a mobile device 106, or a server 107. The charger 103 may provide energy to the smart ring 101 by way of a direct electrical, a wireless, or an optical connection. The smart ring 101 may be in a direct communicative connection with the user device 104, the mobile device 106, or the server 107 by way of the network 105. Interactions between the smart ring 101 and other components of the system 100 are discussed in more detail in the context of FIG. 4.

The smart ring 101 may sense a variety of signals indicative of activities of a user wearing the ring 101, biometric signals, a physiological state of the user, or signals indicative of the user's environment. The smart ring 101 may analyze the sensed signals using built-in computing capabilities or in cooperation with other computing devices (e.g., user device 104, mobile device 106, server 107) and provide feedback to the user or about the user via the smart ring 101 or other devices (e.g., user device 104, mobile device 106, server 107). Additionally or alternatively, the smart ring 101 may provide the user with notifications sent by other devices, enable secure access to locations or information, or a variety of other applications pertaining to health, wellness, productivity, or entertainment.

The smart ring 101, which may be referred to herein as the ring 101, may comprise a variety of mechanical, electrical, optical, or any other suitable subsystems, devices, components, or parts disposed within, at, throughout, or in mechanical connection to a housing 110 (which may be ring shaped and generally configured to be worn on a finger). Additionally, a set of interface components 112a and 112b may be disposed at the housing, and, in particular, through the surface of the housing. The interface components 112a and 112b may provide a physical access (e.g., electrical, fluidic, mechanical, or optical) to the components disposed within the housing. The interface components 112a and 112b may exemplify surface elements disposed at the housing. As discussed below, some of the surface elements of the housing may also be parts of the smart ring components.

As shown in FIG. 1, the components 102 of the smart ring 101 may be distributed within, throughout, or on the housing 110. As discussed in the contexts of FIG. 2 and FIG. 3 below, the housing 110 may be configured in a variety of ways and include multiple parts. The smart ring components 102 may, for example, be distributed among the different parts of the housing 110, as described below, and may include surface elements of the housing 110. The housing 110 may include mechanical, electrical, optical, or any other suitable subsystems, devices, components, or parts disposed within or in mechanical connection to the housing 110, including a battery 120, a charging unit 130, a controller 140, a sensor system 150 comprising one or more sensors, a communications unit 160, a one or more user input devices 170, or a one or more output devices 190. Each of the components 120, 130, 140, 150, 160, 170, and/or 190 may include one or more associated circuits, as well as packaging elements. The components 120, 130, 140, 150, 160, 170, and/or 190 may be electrically or communicatively connected with each other (e.g., via one or more busses or links, power lines, etc.), and may cooperate to enable "smart" functionality described within this disclosure.

The battery 120 may supply energy or power to the controller 140, the sensors 150, the communications unit 160, the user input devices 170, or the output devices 190. In some scenarios or implementations, the battery 120 may supply energy or power to the charging unit 130. The charging unit 130, may supply energy or power to the battery 120. In some implementations, the charging unit 130 may supply (e.g., from the charger 103, or harvested from other sources) energy or power to the controller 140, the sensors 150, the communications unit 160, the user input devices 170, or the output devices 190. In a charging mode of operation of the smart ring 101, the average power supplied by the charging unit 130 to the battery 120 may exceed the average power supplied by the battery 120 to the charging unit 130, resulting in a net transfer of energy from the charging unit 130 to the battery 120. In a non-charging mode of operation, the charging unit 130 may, on average, draw energy from the battery 120.

The battery 20 may include one or more cells that convert chemical, thermal, nuclear or another suitable form of energy into electrical energy to power other components or subsystems 140, 150, 160, 170, and/or 190 of the smart ring 101. The battery 120 may include one or more alkaline, lithium, lithium-ion and or other suitable cells. The battery 120 may include two terminals that, in operation, maintain a substantially fixed voltage of 1.5, 3, 4.5, 6, 9, 12 V or any other suitable terminal voltage between them. When fully charged, the battery 120 may be configured to delivering to power-sinking components an amount of charge, referred to herein as "full charge," without recharging. The full charge of the battery may be 1, 2, 5, 10, 20, 50, 100, 200, 500, 1000, 2000, 5000 mAh or any other suitable charge that can be delivered to one or more power-consuming loads as electrical current.

The battery 120 may include a charge-storage device, such as, for example a capacitor or a super-capacitor. In some implementations discussed below, the battery 120 may be entirely composed of one or more capacitive or charge-storage elements. The charge storage device may be configured to delivering higher currents than the energy-conversion cells included in the battery 120. Furthermore, the charge storage device may maintain voltage available to the components or subsystems 130-190 when one or more cells of the battery 120 are removed to be subsequently replaced by other cells.

The charging unit 130 may be configured to replenish the charge supplied by the battery 120 to power-sinking components or subsystems (e.g., one or more of subsystems 130-190) or, more specifically, by their associated circuits. To replenish the battery charge, the charging unit 130 may convert one form of electrical energy into another form of electrical energy. More specifically, the charging unit 130 may convert alternating current (AC) to direct current (DC), may perform frequency conversions of current or voltage waveforms, or may convert energy stored in static electric fields or static magnetic fields into direct current. Additionally or alternatively, the charging unit 130 may harvest energy from radiating or evanescent electromagnetic fields (including optical radiation) and convert it into the charge stored in the battery 120. Furthermore, the charging unit 130 may convert non-electrical energy into electrical energy. For example, the charging unit 130 may harvest energy from motion, or from thermal gradients.

The controller 140 may include a processor unit 142 and a memory unit 144. The processor unit 142 may include one or more processors, such as a microprocessor (µP), a digital signal processor (DSP), a central processing unit (CPU) or a Micro-controller unit (MCU), a graphical processing unit (GPU), a field-programmable gate array (FPGA), an application-specific integrated circuit (ASIC), or any other suitable electronic processing components. Additionally or alternatively, the processor unit 142 may include photonic processing components.

The memory unit 144 may include one or more computer memory devices or components, such as one or more registers, RAM, ROM, EEPROM, or on-board flash memory. The memory unit 144 may use magnetic, optical, electronic, spintronic, or any other suitable storage technology. In some implementations, at least some of the functionality the memory unit 144 may be integrated in an ASIC or and FPGA. Furthermore, the memory unit 144 may be integrated into the same chip as the processor unit 142 and the chip, in some implementations, may be an ASIC or an FPGA.

The memory unit 144 may store a smart ring (SR) routine 146 with a set of instructions, that, when executed by the processor 142 may enable the operation and the functionality described in more detail below. Furthermore, the memory unit 144 may store smart ring (SR) data 148, which may include (i) input data used by one or more of the components 102 (e.g., by the controller when implementing the SR routine 146) or (ii) output data generated by one or more of the components 102 (e.g., the controller 140, the sensor unit 150, the communication unit 160, or the user input unit 170). In some implementations, other units, components, or devices may generate data (e.g., diagnostic data) for storing in the memory unit 144.

The processing unit 142 may draw power from the battery 120 (or directly from the charging unit 130) to read from the memory unit 144 and to execute instructions contained in the smart ring routine 146. Likewise, the memory unit 144 may draw power from the battery 120 (or directly from the charging unit 130) to maintain the stored data or to enable reading or writing data into the memory unit 144. The processor unit 142, the memory unit 144, or the controller 140 as a whole may be configured to operating in one or more low-power mode. One such low power mode may maintain the machine state of the controller 140 when less than a threshold power is available from the battery 120 or during a charging operation in which one or more battery cells are exchanged.

The controller 140 may receive and process data from the sensors 150, the communications unit 160, or the user input devices 170. The controller 140 may perform computations to generate new data, signals, or information. The controller 140 may send data from the memory unit 144 or the generated data to the communication unit 160 or the output devices 190. The electrical signals or waveforms generated by the controller 140 may include digital or analog signals or waveforms. The controller 140 may include electrical or electronic circuits for detecting, transforming (e.g., linearly or non-linearly filtering, amplifying, attenuating), or converting (e.g., digital to analog, analog to digital, rectifying, changing frequency) of analog or digital electrical signals or waveforms.

The sensor unit 150 may include one or more sensors disposed within or throughout the housing 110 of the ring 101. Each of the one or more sensors may transduce one or more of: light, sound, acceleration, translational or rotational movement, strain, temperature, chemical composition, surface conductivity or other suitable signals into electrical or electronic sensors or signals. A sensor may be acoustic, photonic, micro-electro-mechanical systems (MEMS) sensors, chemical, micro-fluidic (e.g., flow sensor), or any other suitable type of sensor. The sensor unit 150 may include, for example, an inertial motion unit (IMU) for detecting orientation and movement of the ring 101.

The communication unit 160 may facilitate wired or wireless communication between the ring 101 and one or more other devices. The communication unit 160 may include, for example, a network adaptor to connect to a computer network, and, via the network, to network-connected devices. The computer network may be the Internet or another type of suitable network (e.g., a personal area network (PAN), a local area network (LAN), a metropolitan area network (MAN), a wide area network (WAN), a mobile, a wired or wireless network, a private network, a virtual private network, etc.). The communication unit 160 may use one or more wireless protocols, standards, or technologies for communication, such as Wi-Fi, near field communication (NFC), Bluetooth, or Bluetooth low energy (BLE). Additionally or alternatively, the communication unit 160 may enable free-space optical or acoustic links. In some implementations, the communication unit 160 may include one or more ports for a wired communication connections. The wired connections used by the wireless communication module 160 may include electrical or optical connections (e.g., fiberoptic, twisted-pair, coaxial cable).

User input unit 170 may collect information from a person wearing the ring 101 or another user, configured to interacting with the ring 101. In some implementations, one or more of the sensors in the sensor unit 150 may act as user input devices within the user input unit 170. User input devices may transduce tactile, acoustic, video, gesture, or any other suitable user input into digital or analog electrical signal, and send these electrical signals to the controller 140.

The output unit 190 may include one or more devices to output information to a user of the ring 101. The one or more output devices may include acoustic devices (e.g., speaker, ultrasonic); haptic (thermal, electrical) devices; electronic displays for optical output, such as an organic light emitting device (OLED) display, a laser unit, a high-power light-emitting device (LED), etc.; or any other suitable types of devices. For example, the output unit 190 may include a projector that projects an image onto a suitable surface. In some implementations, the sensor unit 150, the user input unit 170, and the output unit 190 may cooperate to create a user interface with capabilities (e.g., a keyboard) of much larger computer systems, as described in more detail below.

The components 120, 130, 140, 150, 160, 170, and/or 190 may be interconnected by a bus 195, which may be implemented using one or more circuit board traces, wires, or other electrical, optoelectronic, or optical connections. The bus 195 may be a collection of electrical power or communicative interconnections. The communicative interconnections may be configured to carry signals that conform to any one or more of a variety of protocols, such as I2C, SPI, or other logic to enable cooperation of the various components.

Figure 2:
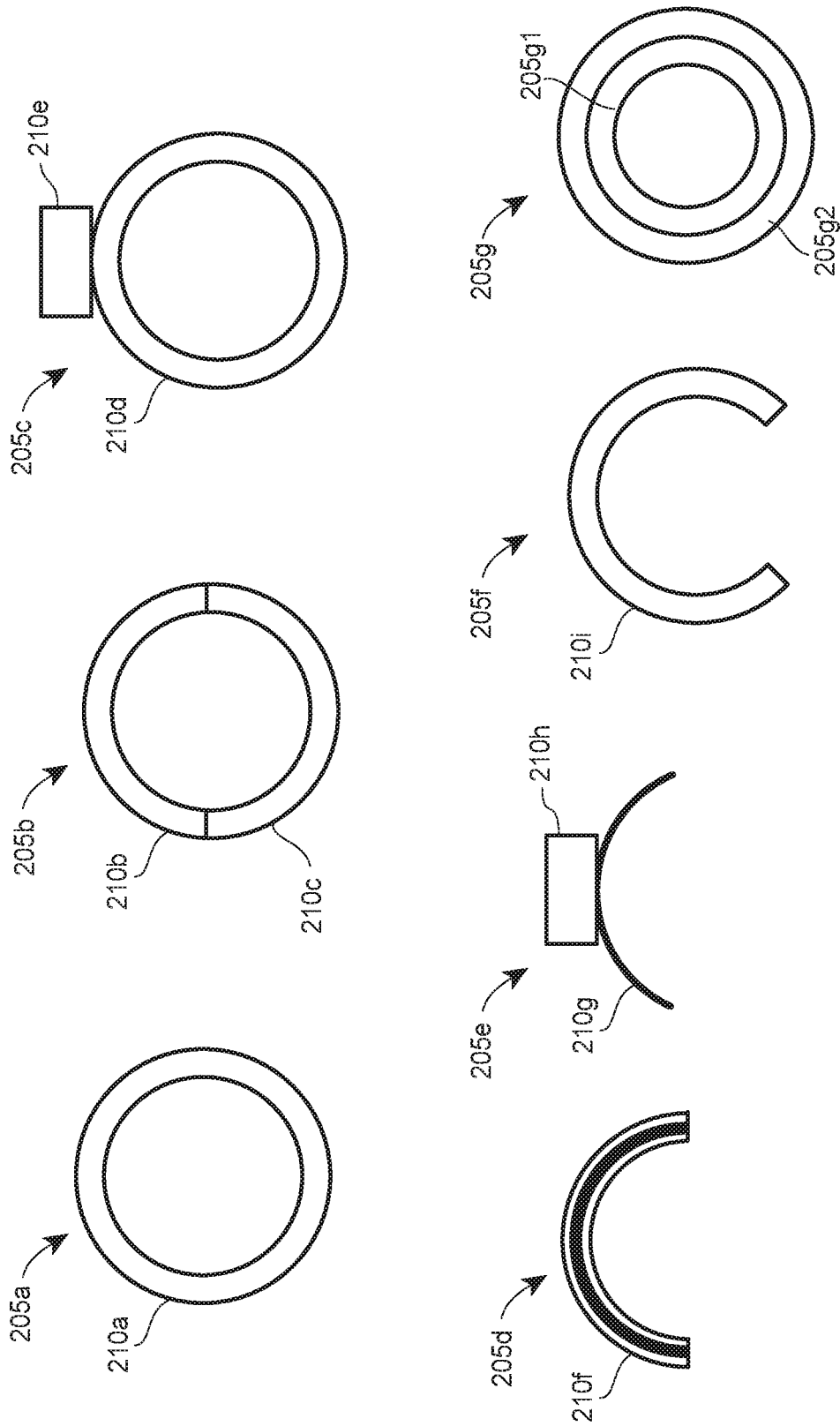
FIG. 2 illustrates a number of different form factor types of a smart ring according to some embodiments.

FIG. 2 includes block diagrams of a number of different example form factor types or configurations 205a, 205b, 205c, 205d, 205e, and/or 205f of a smart ring (e.g., the smart ring 101). The configurations 205a, 205b, 205c, 205d, 205e, and/or 205f (which may also be referred to as the smart rings 205a, 205b, 205c, 205d, 205e, and/or 205f) may each represent an implementation of the smart ring 101, and each may include any one or more of the components 102 (or components similar to the components 102). In some embodiments, one or more of the components 102 may not be included in the configurations 205a, 205b, 205c, 205d, 205e, and/or 205f. The configurations 205a, 205b, 205c, 205d, 205e, and/or 205f include housings 210a-f, which may be similar to the housing 110 shown in FIG. 1.

The configuration 205a may be referred to as a band-only configuration comprising a housing 210a. In the configuration 205b, a band may include two or more removably connected parts, such as the housing parts 210b and 210c. The two housing parts 210b and 210c may each house at least some of the components 102, distributed between the housing parts 210b and 210c in any suitable manner.

The configuration 205c may be referred to as a band-and-platform configuration comprising (i) a housing component 210d and (ii) a housing component 210e (sometimes called the "platform 210e"), which may be in a fixed or removable mechanical connection with the housing 210d, The platform 210e may function as a mount for a "jewel" or for any other suitable attachment. The housing component 210d and the platform 210e may each house at least one or more of the components 102 (or similar components).

In some instances, the term "smart ring" may refer to a partial ring that houses one or more components (e.g., components 102) that enable the smart ring functionality described herein. The configurations 205d and 205e may be characterized as "partial" smart rings, and may be configured for attachment to a second ring. The second ring may be a conventional ring without smart functionality, or may be second smart ring, wherein some smart functionality of the first or second rings may be enhanced by the attachment.

The configuration 205d, for example, may include a housing 210f with a groove to enable clipping onto a conventional ring. The grooved clip-on housing 210f may house the smart ring components described above. The configuration 205e may clip onto a conventional ring using a substantially flat clip 210g part of the housing and contain the smart ring components in a platform 210h part of the housing.

The configuration 205f, on the other hand, may be configured to be configured to being mounted onto a finger of a user without additional support (e.g., another ring). To that end, the housing 210i of the configuration 205f may be substantially of a partial annular shape subtending between 180 and 360 degrees of a full circumference. When implemented as a partial annular shape, the housing 210i may be more adaptable to fingers of different sizes that a fully annular band (360 degrees), and may be elastic. A restorative force produced by a deformation of the housing 210i may ensure a suitable physical contact with the finger. Additional suitable combinations of configurations (not illustrated) may combine at least some of the housing features discussed above.

The configuration 205g may be configured to have two rings, a first ring 205g1 configured to and adapted to be mounted onto a finger of a user, and a second ring 205g2 configured to and adapted to be directly mounted onto the first ring 205g1, as depicted in FIG. 2. Said another way, the first ring 205g1 and the second ring 205g2 are arranged in a concentric circle arrangement, such that the second ring 205g2 does not contact a user's finger when the smart ring 205g is worn. Rather, only the first ring 205g1 contacts the user's finger. Each of the first and second rings 205g1 and 205g2 of the smart ring 205g may include a body having flexible material, as explained more below. In addition, the first ring 205g1 may include a first part, and the second ring 205g2 may include a second part removably connected to the first part, as also further described below.

Figure 3:
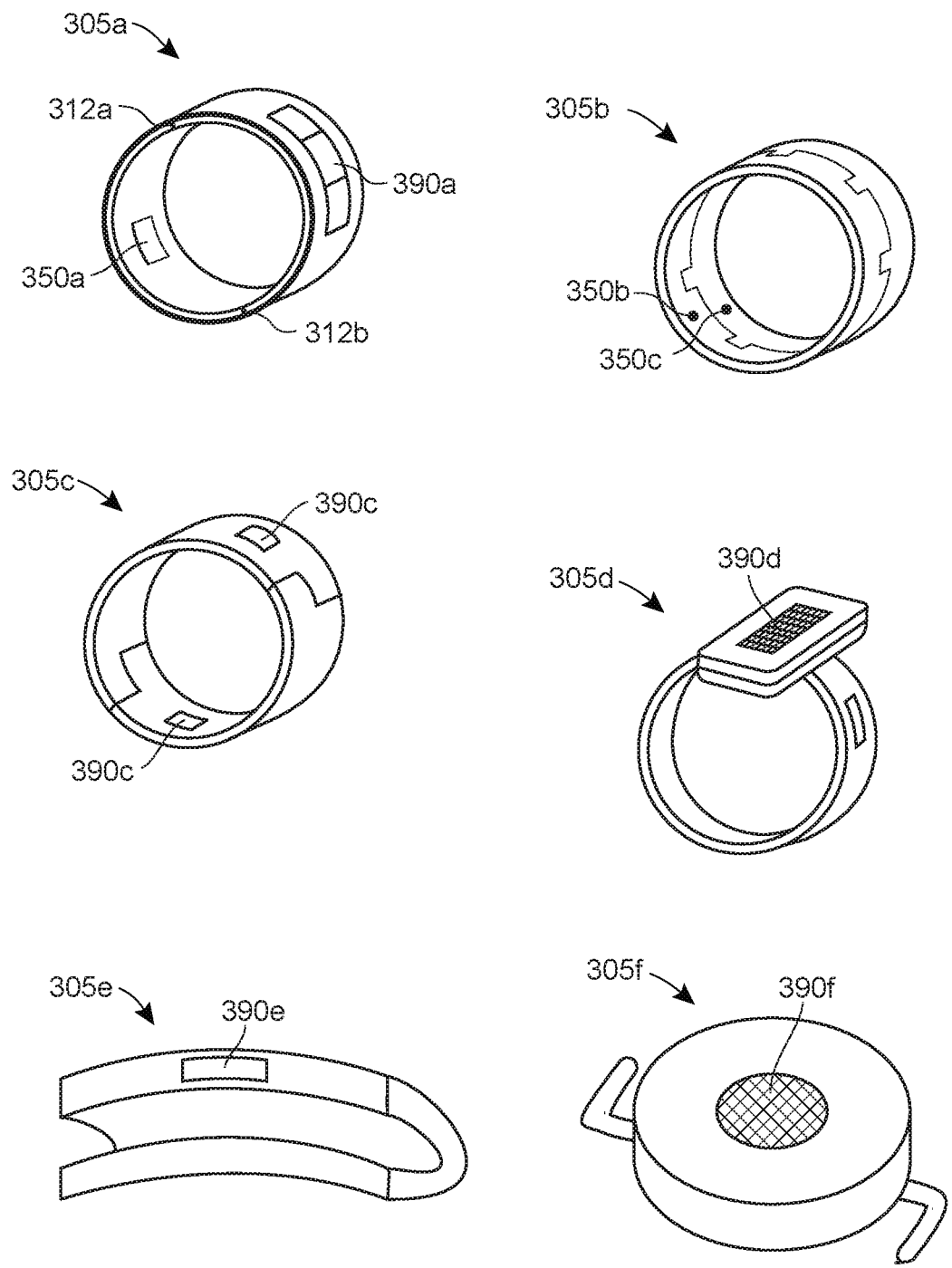
FIG. 3 illustrates examples of different smart ring form factors.

FIG. 3 includes perspective views of example configurations 305a, 305b, 305c, 305d, 305e, and/or 305f of a smart right (e.g., the smart ring 101) in which a number of surface elements are included.

Configuration 305a is an example band configuration 205a of a smart ring (e.g., smart ring 101). Some of the surface elements of the housing may include interfaces 312a, 312b that may be electrically connected to, for example, the charging unit 130 or the communications unit 160. On the outside of the configuration 305a, the interfaces 312a, 312b may be electrically or optically connected with a charger to transfer energy from the charger to a battery (e.g., the battery 120), or with another device to transfer data to or from the ring 305a. The outer surface of the configuration 305a may include a display 390a, while the inner surface may include a biometric sensor 350a.

The configurations 305b and 305c are examples of configurations of a smart ring with multiple housing parts (e.g., configuration 205b in FIG. 2). Two (or more) parts may be separate axially (configuration 305b), azimuthally (configuration 305c), or radially (nested rings, not shown). The parts may be connected mechanically, electrically, or optically via, for example, interfaces analogous to interfaces 312a, 312b in configuration 305a, Each part of a smart ring housing may have one or more surface elements, such as, for example, sensors 350b, 350c or output elements 390b, 390c. The latter may be LEDs (e.g., output element 390b) or haptic feedback devices (e.g., output element 390c), among other suitable sensor or output devices. Additionally or alternatively, at least some of the surface elements (e.g., microphones, touch sensors) may belong to the user input unit 170.

Configuration 305d may be an example of a band and platform configuration (e.g., configuration 205c), while configurations 305e and 305f may be examples of the partial ring configurations 205d and 205e, respectively, Output devices 390d, 390e, 390f on the corresponding configurations 305d, 305e, 305f may be LCD display, OLED displays, e-ink displays, one or more LED pixels, speakers, or any other suitable output devices that may be a part of a suite of outputs represented by an output unit (e.g., output unit 190), Other surface elements, such as an interface component 312c may be disposed within, at, or through the housing. It should be appreciated that a variety of suitable surface elements may be disposed at the illustrated configurations 305a, 305b, 305c, 305d, 305e, and/or 305f at largely interchangeable locations. For example, the output elements 390d, 390e, 390f may be replaced with sensors (e.g., UV sensor, ambient light or noise sensors, etc.), user input devices (e.g., buttons, microphones, etc.), interfaces (e.g., including patch antennas or optoelectronic components communicatively connected to communications units), or other suitable surface elements.

Figure 4:
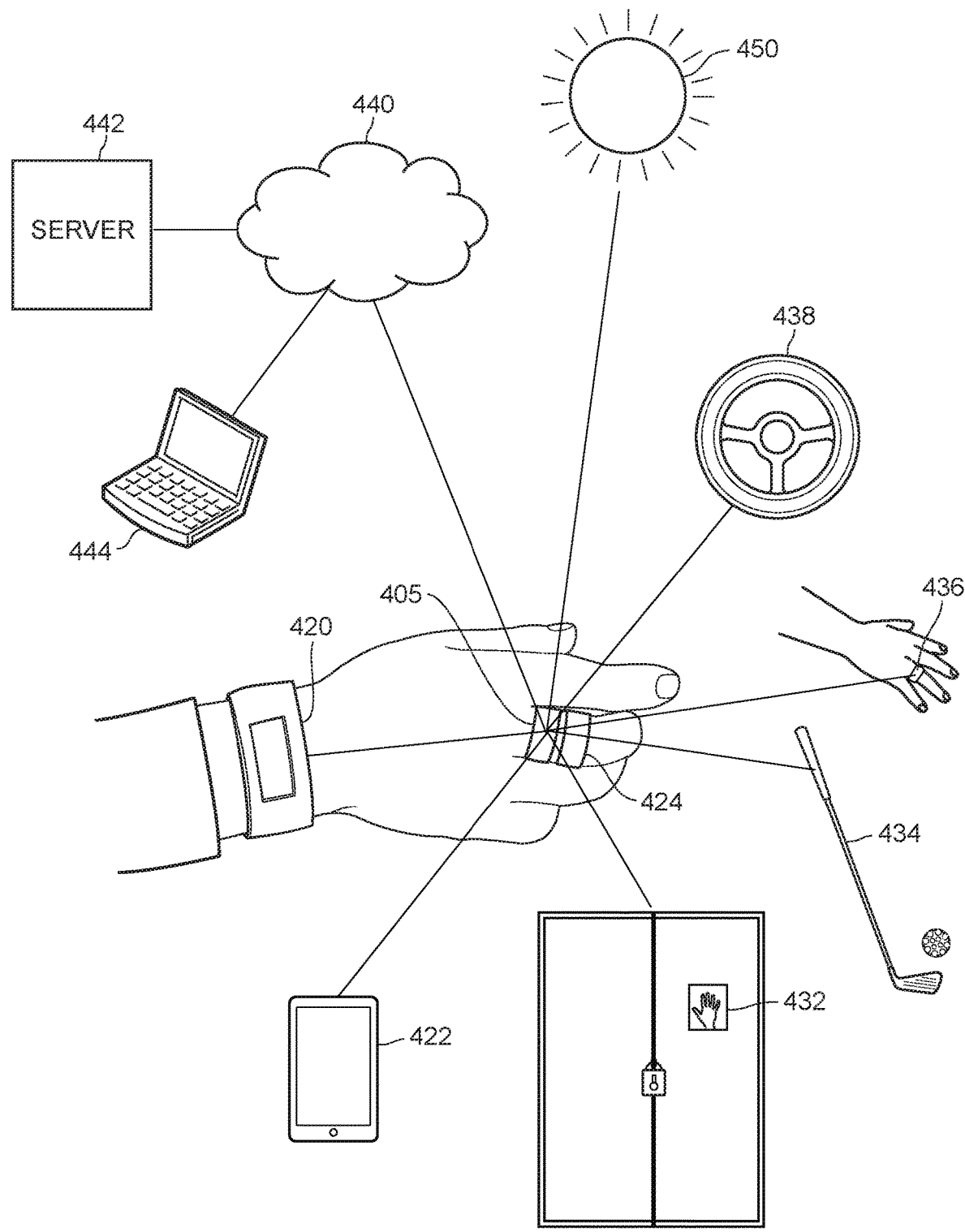
FIG. 4 illustrates an environment within which a smart ring may operate according to some embodiments.

FIG. 4 illustrates an example environment 400 within which a smart ring 405 may be configured to operate. In an embodiment, the smart ring 405 may be the smart ring 101. In some embodiments, the smart ring 405 may be any suitable smart ring configured to providing at least some of the functionality described herein. Depending on the embodiment, the smart ring 405 may be configured in a manner similar or equivalent to any of the configurations 205a, 205b, 205c, 205d, 205e, and/or 205f or 305a, 305b, 305c, 305d, 305e, and/or 305f shown in FIG. 2 and FIG. 3.

The smart ring 405 may interact (e.g., by sensing, sending data, receiving data, receiving energy) with a variety of devices, such as bracelet 420 or another suitable wearable device, a mobile device 422 (e.g., a smart phone, a tablet, etc.) that may be, for example, the user device 104, another ring 424 (e.g., another smart ring, a charger for the smart ring 405, etc.), a secure access panel 432, a golf club 434 (or another recreational accessory), a smart ring 436 worn by another user, or a steering wheel 438 (or another vehicle interface). Additionally or alternatively, the smart ring 405 may be communicatively connected to a network 440 (e.g., WiFi, 5G cellular), and by way of the network 440 (e.g., network 105 in FIG. 1) to a server 442 (e.g., server 107 in FIG. 1) or a personal computer 444 (e.g., mobile device 106). Additionally or alternatively, the ring 405 may be configured to sense or harvest energy from natural environment, such as the sun 450.

The ring 405 may exchange data with other devices by communicatively connecting to the other devices using, for example, the communication unit 160. The communicative connection to other device may be initiated by the ring 405 in response to user input via the user input unit 170, in response to detecting trigger conditions using the sensor unit 150, or may be initiated by the other devices. The communicative connection may be wireless, wired electrical connection, or optical. In some implementation, establishing a communicative link may include establishing a mechanical connection.

The ring 405 may connect to other devices (e.g., a device with the charger 103 built in) to charge the battery 120. The connection to other devices for charging may enable the ring 405 to be recharged without the need for removing the ring 405 from the finger. For example, the bracelet 420 may include an energy source that may transfer the energy from the energy source to battery 120 of the ring 405 via the charging unit 430. To that end, an electrical (or optical) cable may extend from the bracelet 420 to an interface (e.g., interfaces 112a, 112b, 312a, 312b) disposed at the housing (e.g., housings 110, 210a, 210b, 210c, 210d, 210e, 210f, 210g, 210h, and/or 210i) of the ring 405. The mobile device 422, the ring 424, the golf club 434, the steering wheel 438 may also include energy source configured as chargers (e.g., the charger 103) for the ring 405. The chargers for may transfer energy to the ring 405 via a wired or wireless (e.g., inductive coupling) connection with the charging unit 130 of the ring 405.

Figure 5A:
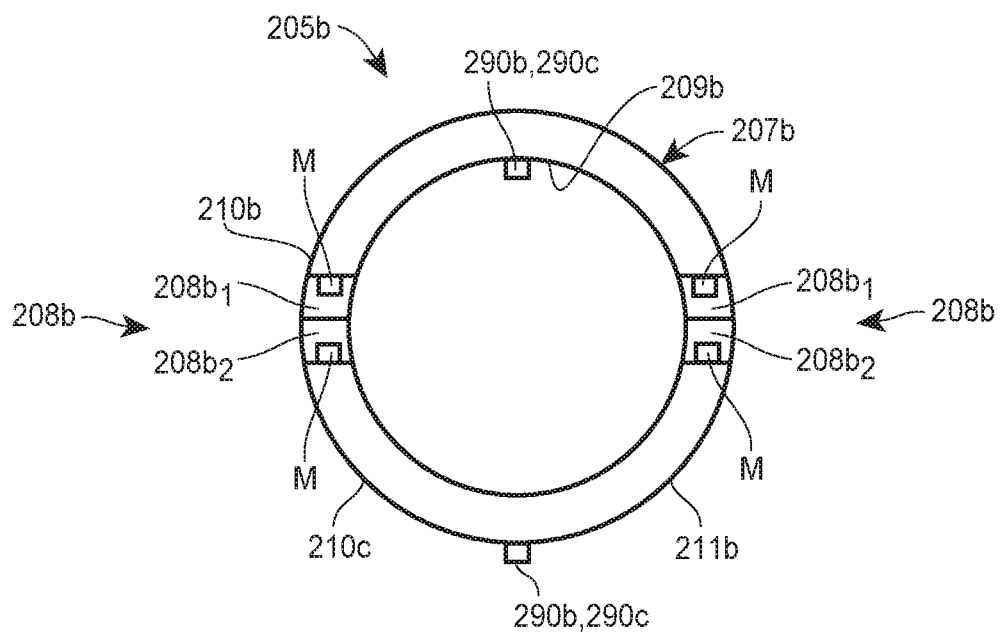
FIG. 5A is a view of a smart ring depicted in FIG. 2 according to some embodiments.

Referring now to FIG. 5A, the smart ring 205b of FIG. 2 is depicted with some additional features. In particular, the smart ring 205b includes a body 207b, such as a housing, having the first part 210b and the second part 210c that is removably connected to the first part 210b. The body 207g may include a flexible material, such as any material configured to bending or conforming to a user's finger, for example. The body 207b further includes one pair of break-away portions 208b disposed within the body 207b adjacent to and separate from the first and second parts 210b, 210c. The at least one pair of break-away portions 210b, 210c are attached to the first and second parts 210b, 210c, respectively, connecting the second part 210c to the first part 210b, as explained more below. Any of the previously defined components 102, such as one or more of the battery 120, the charging unit 130, the controller 140, the processor unit 142, the memory unit 144, the sensor unit 150, the user input unit 170 or the output unit 190 may be disposed in or on one or more of the first part 210b or the second part 210c of the body 207b.

In one example, the at least one pair of break-away portions 208b may include one pair of magnetic break-away portions 208b. The at least one pair of magnetic break-away portions 208b may include a first magnetic break-away portion 208b1 disposed at and/or adjacent to an end of the first part 210b of the body 207b. A second magnetic break-away portion 208b2 is disposed at and/or adjacent to an end of the second part 210c, such that the first and second magnetic break-away portions contact each other to connect the second part 210c to the first part 210b of the body 207b. The first break-away portion 208b1 includes a magnet M and the second magnetic break-away part 208b2 includes a magnet M. The magnets M have opposite polarity and, thus, are attracted to each other to secure the first and second magnetic break-away portions 208b1, 208b2 together when in contact with each other. In addition, the first and second magnetic break-away portions 208b1, 208b2 are removable from each other upon movement of the first break-away portion 208b1 in a direction away from the second break-away portion 208b2. In another example, the first and second magnetic break-away portions 208b1, 208b2 are removable from each other upon movement of the first part 210b in a direction away from the second part 210c because the first part 210b is attached to the first break-away magnetic portion 208b1 and the second part 210c is attached to the second break-away magnetic portion 208b2.

In addition, the body 207b of the smart ring 205b further includes an inside surface 209b adapted to contact a finger of a user during use of the smart ring 205b. The inside surface 209b may include one or more of at least one sensor 290b or an output element 290c, While the at least one sensor 290b or the at least one output element 290c are depicted in FIG. 5 as extending from the inside surface 209b of the smart ring 205b, the at least one sensor 290b and the at least one output element 290c may additionally and/or alternatively be disposed directly on the inside surface 209b, but not extend from the inside surface 209b.

Further, the body 207b also includes an outside surface 211b. In a similar manner, the outside surface 211b may include one or more of the at least one sensor 290b or the output element 290c, for example, extending from the outside surface 211b. Alternatively, the at least one sensor 290b or the at least one output element 290c may not extend from the outside surface 211b, but instead be directly disposed thereon in the same plane, for example, as the outside surface 211b, such that no part of the at least one sensor 290b or the at least one output element 290c extends from the outside surface 211b.

Still further, the smart ring 205b may include more than one pair of magnetic break-away portions 208b and still fall within the scope of the present disclosure. For example, and as depicted in FIG. 5, the smart ring 205b includes two pairs of magnetic break-away portions 208b. A first pair of magnetic break-away portions 208b is disposed on one side of the smart ring 205b, while a second pair of magnetic break-away portions 208b is disposed on another side of the smart ring 205b opposite the first pair of magnetic break-away portions 208b. Alternatively, only one pair of magnetic break-away portions 208b may be disposed on the body 207b, such as a single pair of magnetic break-away portions 208b disposed on only one of the two sides of the body 207b and still fall within the scope of the present disclosure.

Figure 5B:
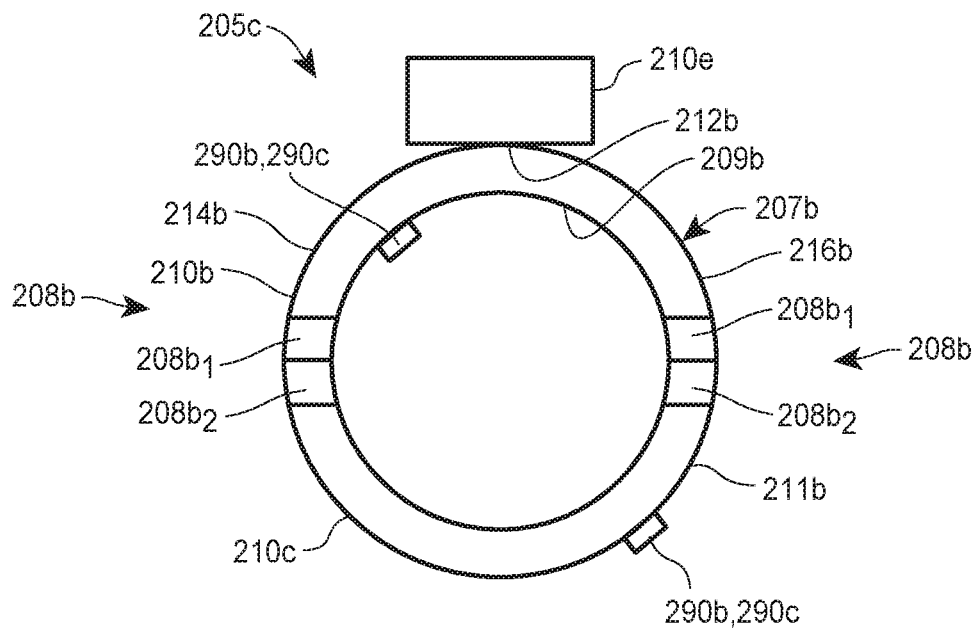
FIG. 5B is a view of another smart ring depicted in FIG. 2 according to some embodiments.

Referring now to FIG. 5B, the smart ring 205c of FIG. 2 is depicted with some additional features. In particular, and like the smart ring 205b of FIG. 5A, the smart ring 205c includes all the same features except the smart ring 205c of FIG. 5B further includes a housing 210e coupled to the body 207b of the smart ring 205c. As a result, the parts of the smart ring 205c identical to parts of the smart ring 205b will not be described again here for the sake of brevity.

More specifically, the smart ring 205c of FIG. 5B may include the housing 210e coupled to the body 207b. In one example, the housing 210e is coupled to a top area 212b of the body 207b. However, it will be appreciated that the housing 210e may alternatively be coupled to another area of the body 207b, such as a first side area 214b, a second side area 216b, or any other area of the smart ring 205c configured to receiving the housing 210e and still fall within the scope of the present disclosure. The housing 210e may include one or more of the previously defined components 102, such as one or more of the battery 120, the charging unit 130, the controller 140, the processor unit 142, the memory unit 144, the sensor unit 150, the user input unit 170 or the output unit 190. In addition to the housing 210e, the body 207b may likewise include one or more of the battery 120, the charging unit 130, the controller 140, the processor unit 142, the memory unit 144, the sensor unit 150, the user input unit 170 or the output unit 190.

Figure 6:
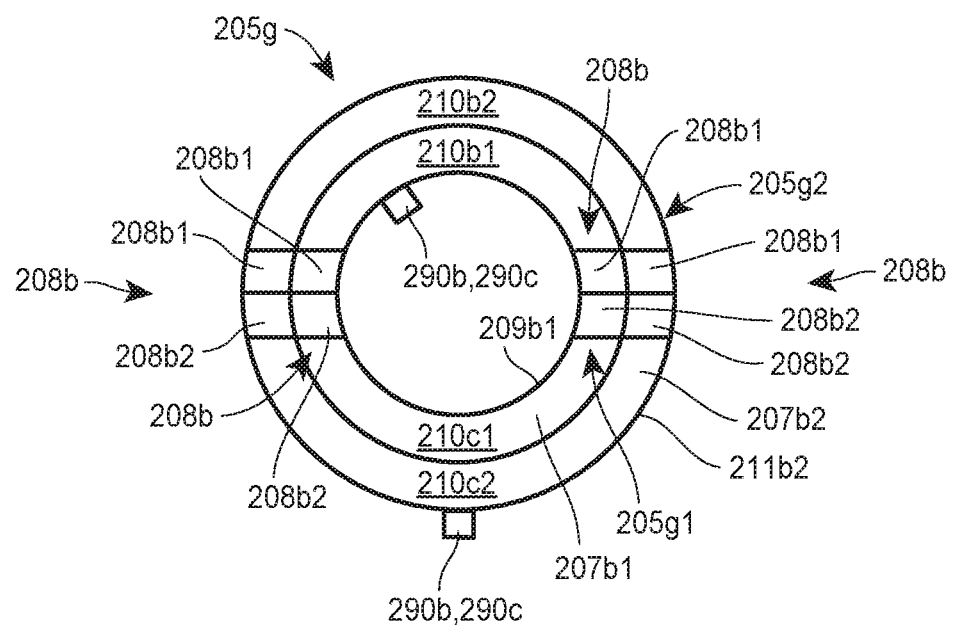
FIG. 6 is a view of another smart ring depicted in FIG. 2 according to some embodiments.

Referring now to FIG. 6, the smart ring 205g of FIG. 2 is depicted with some additional features. In particular, and like the smart ring 205g of FIG. 2, the smart ring 205g includes the first ring 205g1 and the second ring 205g2. Each of the first and second rings 205g1 and 205g2 includes a body 207b1 and 207b2, respectively, such as a housing. The body 207b1 of the first ring 205g1 includes a first part 210b1 and a second part 210c1 that is removably connected to the first part 210b1. Likewise, the body 207b2 of the second ring 205g2 includes a first part 210b2 and a second part 210c2 that is also removably connected to the first part 210b2. Each of the body 207b1 and the body 207b2 may include a flexible material, such as any material configured to bending or conforming to a user's finger, for example. Each body 207b1, 207b2 further includes one pair of break-away portions 208b disposed within the body 207b1, 207b2 adjacent to and separate from the first and second parts 210b1, 210c1 or 210b2, 210c2, as relevant. The at least one pair of break-away portions 208b are attached to the first and second parts 210b1, 210b2, 210c1, 210c2, respectively, connecting the second part 210c1, 210c2 to the first part 210b1, 210b2, as explained more below. Any of the previously defined components 102, such as one or more of the battery 120, the charging unit 130, the controller 140, the processor unit 142, the memory unit 144, the sensor unit 150, the user input unit 170 or the output unit 190 may be disposed in or on one or more of the first part 210b1, 210b2 or the second part 210c1, 210c2 of the body 207b1, 207b2, respectively.

In one example, the at least one pair of break-away portions 208b may include the at least one pair of magnetic break-away portions 208b. The at least one pair of magnetic break-away portions 208b may include a first magnetic break-away portion 208b1 disposed at and/or adjacent to an end of the first part 210b1, 210b2 of the body 207b1, 207b2. A second magnetic break-away portion 208b2 is disposed at and/or adjacent to an end of the second part 210c1, 210c2, such that the first and second magnetic break-away portions contact each other to connect the second part 210c1, 210c2 to the first part 210b1, 210b2 of the body 207b1, 207b2. The first break-away portion 208b1 includes a magnet M and the second magnetic break-away part 208b2 includes a magnet M. The magnets M have opposite polarity and, thus, are attracted to each other to secure the first and second magnetic break-away portions 208b1, 208b2 together when in contact with each other. In addition, the first and second magnetic break-away portions 208b1, 208b2 are removable from each other upon movement of the first break-away portion 208b1 in a direction away from the second break-away portion 208b2. In another example, the first and second magnetic break-away portions 208b1, 208b2 are removable from each other upon movement of the first part 210b in a direction away from the second part 210c because the first part 210b is attached to the first break-away magnetic portion 208b1 and the second part 210c is attached to the second break-away magnetic portion 208b2.

In addition, the body 207b1 of the smart ring 205g further includes an inside surface 209b1 adapted to contact a finger of a user during use of the smart ring 205g. The inside surface 209b1 may include one or more of the at least one sensor 290b or the output element 290c, While the at least one sensor 290b or the at least one output element 290c are depicted in FIG. 6 as extending from the inside surface 209b1 of the smart ring 205b, the at least one sensor 290b and the at least one output element 290c may additionally and/or alternatively be disposed directly on the inside surface 209b1, but not extend from the inside surface 209b1.

Further, the body 207b2 also includes an outside surface 211b2. In a similar manner, the outside surface 211b2 may include one or more of the at least one sensor 290b or the output element 290c, for example, extending from the outside surface 211b. Alternatively, the at least one sensor 290b or the at least one output element 290c may not extend from the outside surface 211b2, but instead be directly disposed thereon in the same plane, for example, as the outside surface 211b2, such that no part of the at least one sensor 290b or the at least one output element 290c extends from the outside surface 211b2.

Figure 7:
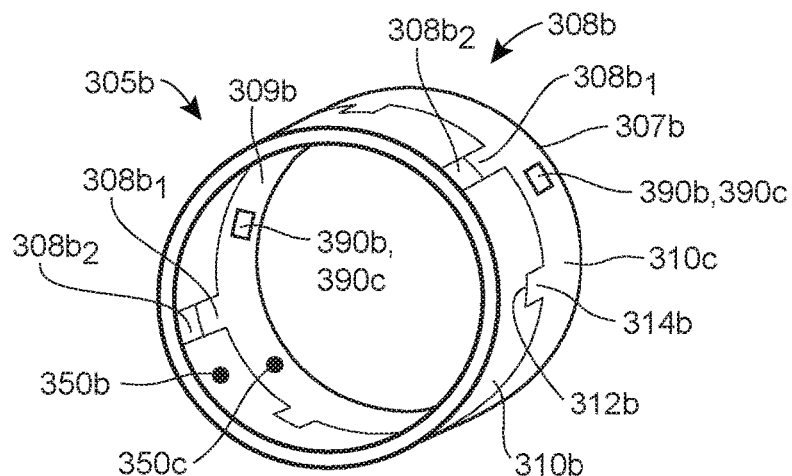
FIG. 7 is a perspective view of a smart ring depicted in FIG. 3 according to some embodiments.

Referring now to FIG. 7, the smart ring 305b of FIG. 3 is depicted with some additional features. As noted above, the smart ring 305b includes multiple body parts that may be separate axially and are in a configuration different from the smart rings 205b and 205c of FIG. 5 and FIG. 6, respectively. In particular, the smart ring 305b includes a body 307b, such as a housing, having the first part 310b and the second part 310c that is axially separate from the first part 310b and removably connected to the first part 210b. In one example, the first body part 310b may be a front body part 310b of the smart ring 305b, and the second body part 310c may be a rear body part 310c of the smart ring 305b. The body 307g may include a flexible material, such as any material configured to bending or conforming to a user's finger, for example. The body 307b further includes a pair of break-away portions 308b disposed within the body 307b adjacent to and separate from the first and second parts 310b, 310c. Any of the previously defined components 102, such as one or more of the battery 120, the charging unit 130, the controller 140, the processor unit 142, the memory unit 144, the sensor unit 150, the user input unit 170 or the output unit 190 may be disposed in or on one or more of the first part 310b or the second part 310c of the body 307b.

The at least one pair of break-away portions 308b may include a pair of magnetic break-away portions. The pair of magnetic break-away portions 308b may include a first break-away magnetic portion 308b1 disposed at and/or adjacent to a portion of the first part 310b of the body 307b. A second magnetic break-away portion 308b2 is disposed at and/or adjacent to a portion of the second part 310c, such that the first and second magnetic break-away portions 308b1, 308b2 contact each other to connect the second part 210c to the first part 210b of the body 207b. The first magnetic break-away portion 308b1 includes a magnet M, and the second magnetic break-away portion 308b2 likewise includes a magnet M. The magnets M have opposite polarity and, thus, are attracted to each other to secure the first and second magnetic break-away portions 308b1, 308b2 together (and, thus, the first and second parts 310b and 310c to which the first and second magnetic break-away portions 308b1, 308b2 are attached) when in contact with each other. In addition, the first and second magnetic break-away portions 308b1, 308b2 are removable from each other upon movement of the first magnetic break-away portion 308b1 in a direction away from the second magnetic break-away portion 308b2. In another example, the first and second magnetic break-away portions 308b1, 308b2 are removable from each other upon movement of the first part 310b in a direction away from the second part 310c because the first part 310b is attached to the first break-away magnetic portion 308b1 and the second part 310c is attached to the second break-away magnetic portion 308b2.

In addition, the body 307b of the smart ring 305b further includes an inside surface 309b adapted to contact a finger of a user during use of the smart ring 205b. The inside surface 309b may include one or more of at least one sensor 390b or an output element 390c. The body 307b may also include an outside surface 311b. In a similar manner, the outside surface 311b may include one or more of the at least one sensor 390b or the output element 390c, for example.

Still further, the smart ring 305b may also include more than one pair of magnetic break-away portions 308b and still fall within the scope of the present disclosure. For example, and as depicted in FIG. 7, the smart ring 305b includes two pairs of magnetic break-away portions 308b. A first pair of magnetic break-away portions 308b is disposed on one side of the smart ring 305b, while a second pair of magnetic break-away portions 308*b* is disposed on another side of the smart ring 305*b* opposite the first pair of magnetic break-away portions 208*b*.

The first body part 310*b*, such as the front body part 310*b*, may include one recess 312*b* adapted to receive a portion of the second body part 311*b* when the first body part and the second body part 310*b*, 311*b* are coupled together. Specifically, the second body part 311*b*, such as the rear body part 311*b*, may include one tab 314*b* extending from a rim of the second body part 311*b* that fits into the at least one recess 312*b* of the first body part 310*b* when coupled to the second body part 311*b*. As will also be appreciated, and as depicted in FIG. 7, the first body part 310*b* may further include more than one recess 312*b*, such as two, three, four, five or more recesses 312*b*, and the second body part 311*b* may likewise include more than one tab 314*b*, such as two, three, four, five or more tabs 314*b*. So configured, the first body part 310*b* includes a number of recesses 312*b* that correspond to or are the same as the number of tabs 314*b* of the second body part 311*b*, such that the tabs 314*b* fit into the recesses 312*b* when the first body part and the second body part 310*b*, 311*b* of the smart ring 305*b* are coupled together.

In one example, the first magnetic break-away portion 308*b*1 is disposed adjacent to the recess 21*b*, and the second magnetic break-away portion 308*b*2 is disposed on and/or attached to the tab 314*b*, as depicted in FIG. 7. So configured, the magnets M of each of the first and second magnetic break-away portions 308*b*1 and 308*b*2 are attracted to and contact each other, creating a force that maintains contact between the first and second break magnetic break-away portions 308*b*1, 308*b*2.

Figure 8:
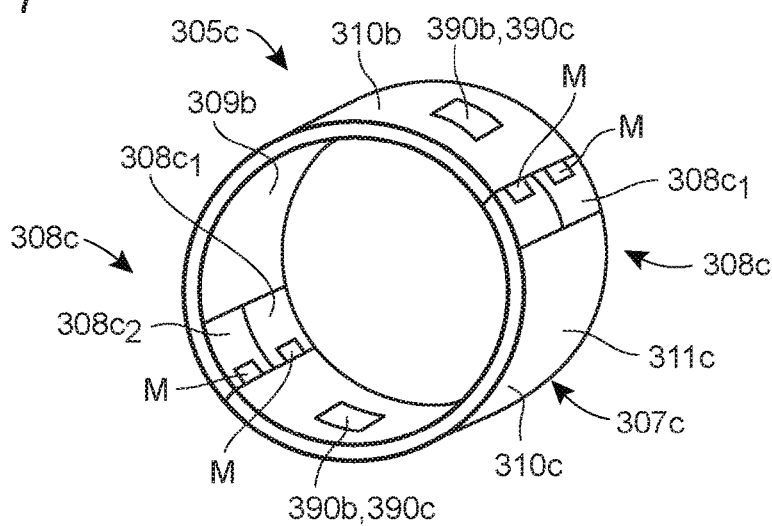
FIG. 8 is a perspective view of another smart ring depicted in FIG. 3 according to some embodiments.

Referring now to FIG. 8, the smart ring 305*c* of FIG. 3 is depicted with additional features. As noted above, the smart ring 305*c* again includes multiple body parts in a configuration different from the smart rings 205*b* and 205*c* of FIG. 5 and FIG. 6, respectively, and the smart ring 305*b* of FIG. 7. In particular, the smart ring 305*c* includes a body 307*c*, such as a housing, having the first part 310*b* and the second part 310*c* that is separate from the first part 310*b* and removably connected to the first part 310*b*. In this example, the first body part 310*b* may be a top body part 310*b* of the smart ring 305*b*, and the second body part 310*c* may be a bottom body part 310*c* of the smart ring 305*b*. The body 307*c* may include a flexible material, such as any material configured to bending or conforming to a user's finger, for example. The body 307*c* further includes one pair of break-away portions 308*c* disposed within the body 307*c* adjacent to and separate from the first and second parts 310*b*, 310*c*. Any of the previously defined components 102, such as one or more of the battery 120, the charging unit 130, the controller 140, the processor unit 142, the memory unit 144, the sensor unit 150, the user input unit 170 or the output unit 190 may be disposed in or on one or more of the first part 310*b* or the second part 310*c* of the body 307*c*.

The at least one pair of break-away portions 308*c* may include the at least one pair of magnetic break-away portions 308*c*. The at least one pair of magnetic break-away portions 308*c* includes a first magnetic break-away portion 308*c*1 and a second magnetic break-away portion 308*c*2 disposed adjacent to and in contact with each other. In this example, the first break-away portion 308*c*1 is separate from and attached to the first part 310*b* of the body 307*c*. In addition, the second break-away portion 308*c*2 is separate from and attached to the second part 310*c* of the body 307*c*. The first magnetic break-away portion 308*c*1 includes a magnet M and the second magnetic break-away portion 308*c*2 includes a magnet M. The magnets M have opposite polarity and, thus, are attracted to each other to secure the first and second magnetic break-away portions 308*c*1, 308*c*2 together (and, thus, the first and second parts 310*b*, 310*c*) when in contact with each other. In addition, the first and second magnetic break-away portions 308*c*1, 308*c*2 are removable from each other upon movement of the first break-away portion 308*c*1 in a direction away from the second break-away portion 308*c*2. Likewise, because the first and second magnetic break-away portion 308*c*1, 308*c*2 are attached to the first and second parts 31013, 310*c* of the body 307*c*, the first and second magnetic break-away portions 308*b*1, 308*b*2 are also removable from each other upon movement of the first part 310*b* from the second part 310*c* of the body 307*c*.

In addition, the body 307*c* of the smart ring 305*c* further includes an inside surface 309*c* adapted to contact a finger of a user during use of the smart ring 205*c*. The inside surface 309*c* may include one or more of at least one sensor 390*b* or an output element 390*c*. The body 307*c* may also include an outside surface 311*b*. In a similar manner, the outside surface 311*c* may include one or more of the at least one sensor 390*b* or the output element 390*c*, for example.

Figure 9:
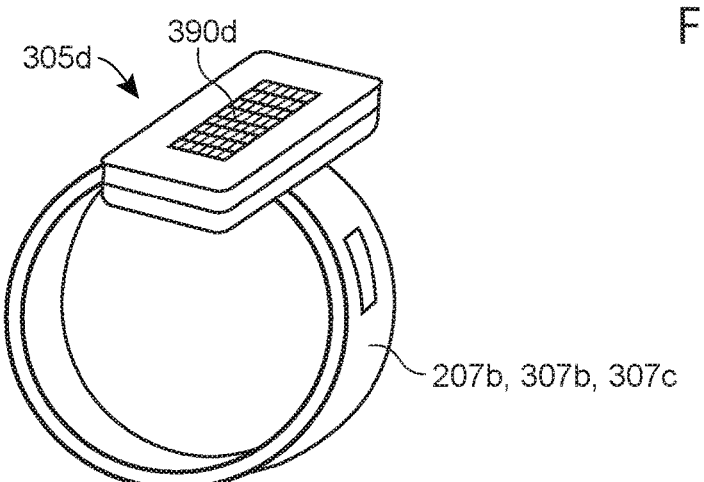
FIG. 9 is a perspective view of another smart ring depicted in FIG. 3 according to some embodiments.

Still further, the smart ring 305*c* may again also include more than one pair of magnetic break-away portions 308*c* and still fall within the scope of the present disclosure. For example, and as depicted in FIG. 8, the smart ring 305*c* includes two pairs of magnetic break-away portions 308*c*. A first pair of magnetic break-away portions 308*c* is disposed on one side of the smart ring 305*c*, while a second pair of magnetic break-away portions 308*c* is disposed on another side of the smart ring 305*c* opposite the first pair of magnetic break-away portions 308*c*. Referring now to FIG. 9, the smart ring 305*d* of FIG. 3 is depicted with some additional features. As noted above, the smart ring 305*d* may be an example of a band and platform configuration, and the band may comprise the body 207*b*, 307*b*, and 307*c* of each of the smart rings 205*c*, 305*b*, an 305*c*, respectively, and include any one or all of the features previously described relative to each body 207*b*, 307*b*, and 307*c*. As depicted in FIG. 9, the body 207*b*, 307*b*, and 307*c* of each of the smart rings 205*c*, 305*b*, and 305*c* may include an output device 390 separate from and coupled to a portion of the body 207*b*, 307*b*, and 307*c*. While the output device 390 is disposed in a top area of the body 207*b*, 307*b*, and 307*c*, the output device 390 may alternatively be disposed on another area of the body 207*b*, 307*b*, and 307*c*, such as one or more side areas, and still fall within the scope of the present disclosure. The output device 390 may include one or more of an LCD display, an OLED display, e-ink displays, one or more LED pixels, or a speaker.

Each of the foregoing smart rings 205*b*, 205*c*, 205*g*, 305*b*, 305*c*, and 305*d* may include one or more of a portion of the body 207*b*, 207*b*1, 207*b*2, 307*b*, and 307*c* comprising an electric sensor fabric material. In addition, each body 207*b*, 207*b*1, 207*b*2, 307*b*, and 307*c* may include silicone material adapted to function as part of one of an artificial muscle or a nerve. The silicone material is configured to one or more of generating electricity or sensing pressure. Moreover, each body 207*b*, 207*b*1, 207*b*2, 307*b*, and 307*c* may be one of additively manufactured or heat molded according to a user's dimensions obtained by one of scanning or photographing a portion of the user's hand or a mold indicative of the user's finger dimensions, for example, as explained more below.

Figure 10:
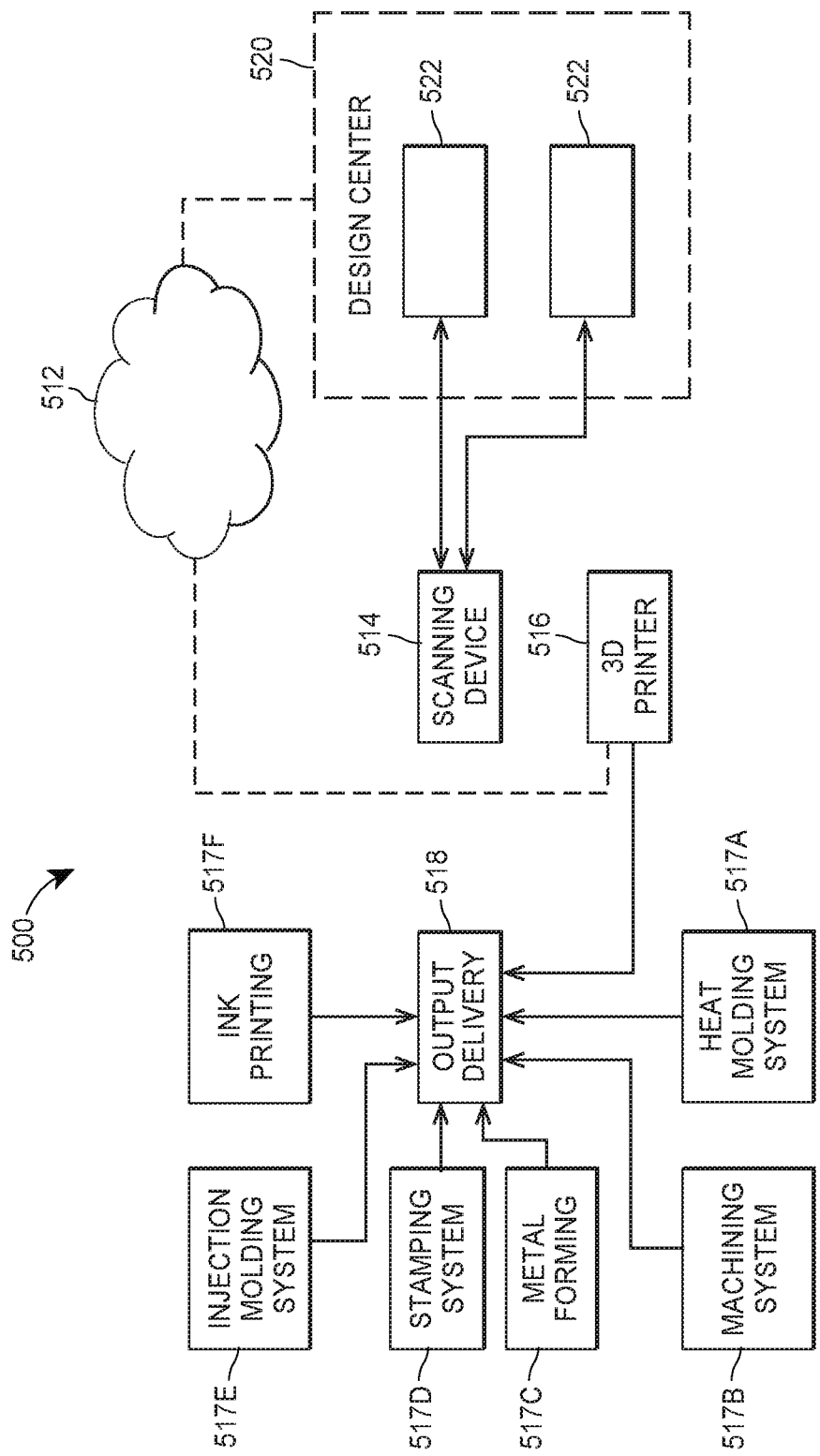
FIG. 10 is a perspective view of a system for manufacturing a smart ring according to an aspect of the present disclosure.
Figure 11:
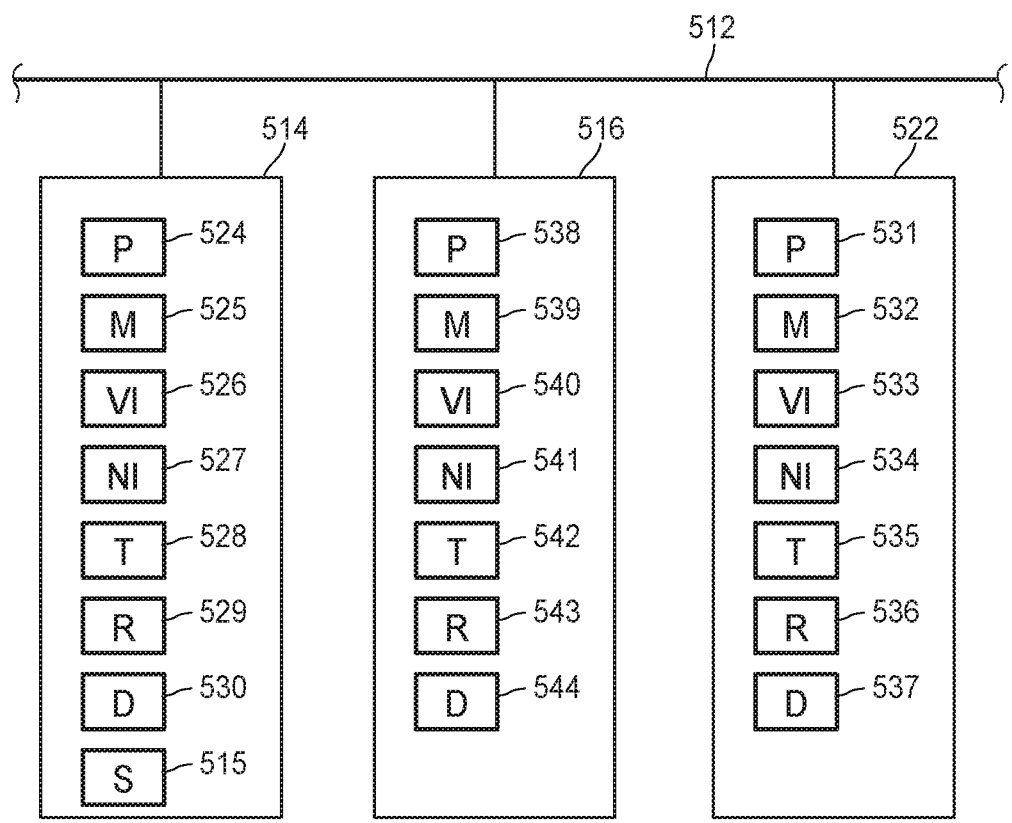
FIG. 11 is a block diagram of a portion of the system of FIG. 10 according to some embodiments.

Referring now to FIG. 10, a system 500 for manufacturing any one of the foregoing smart rings is depicted. The system 500 includes a communication network 512, a scanning device 514 communicatively coupled to the communication network 512, such as a wireless network, and a design center 520 also communicatively coupled to the scanning device 514 and the communication network 512, as depicted in FIG. 10. The scanning device 514 scans a user's body part, such as the user's finger, to create a user-specific scan for the smart ring. The scanning device 514 may include one or more various known computing devices, such as an iPad, an iPod, an iPhone or any other smart phone, tablet or other device having such scanning capabilities, for example, and may further include a volumetric capture sensor 515 (FIG. 11). The user-specific scan is later used to make the additively manufactured smart ring via a 3D printer, as described more below.

The system 500 further includes a 3D printer 516, which additively manufactures the user-specific smart ring, and an output delivery center 518 for delivery of a final and complete additively manufactured smart ring. The system 500 further includes a design system 520 communicatively coupled to both the scanning device 514 and the 3D printer 516. In one example, the design system 520 is communicatively coupled via the communication network 521, such as wireless network 21. As depicted, the design system 520 includes one or more computing devices 522 that may receive data corresponding to a scan of the user's finger or hand via the scanning device 514. At least one computing device 522 of the design system 520 then sends the user-specific design to the 3D printer 516, such as via the wireless network 521, directing the 3D printer 16 to additively manufacture one of the foregoing smart rings according to the user-specific design.

Alternatively and/or additionally, the system 500 for manufacturing any one of the foregoing smart rings may include a heat molding system 517A, a machining system 517B, a metal forming system 517C, a stamping system 517D, an injection molding system 517E, and/or an ink printing system 517F, each of which is coupled to the output delivery center 518 for delivery of the complete smart ring, as depicted in FIG. 10.

Referring now to FIG. 11, in one example, the scanning device 514 includes one or more processors 524 that implement a scanning module stored in a memory 525 of the scanning device 514 to scan a finger or a portion of a hand of the user. The scanning device 514 may also include a user-input 526 and a network interface 527, which allows the scanning device 514 to be communicatively coupled to the wireless network 521, for example, and communicate with the design system 520. The scanning device 514 further includes a transmitter 528 and a receiver 529, such that the transmitter 528 transmits scanned data corresponding to the user-specific scan (e.g., of the finger of the user) to the design system 520 for processing, as explained more below. Further, the scanning device 514 may also include a display 530 on which the scanned data corresponding to the user may be displayed, for example.

In a similar manner, the one or more computing devices 522 of the system 520 also includes one or more processors 531 that implement a module stored in a memory, such as a memory 532 of the computing device 522, to receive and process data corresponding to the user-specific scan from the scanning device 514. The computing device 522 may also include a user-input 533 and a network interface 534, which allows the computing device to be communicatively coupled to the wireless network 521 and communicate with both the scanning device 514 and the 3D printer 516. The design system computing device 522 may also include a transmitter 535 and a receiver 536, such that the transmitter 535 transmits processed data relative to a user-specific scan (e.g., from the scanning device 14) to the 3D printer 516, directing the 3D printer 516 to print a smart ring according to the user-specific scan. The receiver 536 receives scanning data from the scanning device 514, which is processed by one or more processors 531 of the computing device 522 and used to implement the operation of the 3D printer 516. The computing device 522 also includes a display 537, on which data, such as data from the scanning device 514 and data processed by the computing device 522, may be displayed.

Still referring to FIG. 11, the 3D printer 516 is communicatively coupled to both the scanning device 514 and the design system 520. The 3D printer 516 includes one or more processors 538 that implement a user-specific smart ring profile created and then transmitted from the computing device 322 of the design system to the 3D printer 316 and stored in a memory 539 of the 3D printer 516. The user-specific smart ring design profile that may be stored in the memory 539 of the 3D printer 16 includes a user-specific design protocol for execution by one or processors 538 of the 3D printer 516. The 3D printer 516 may also include a user-input 540 and a network interface 541, which also allows the 3D printer 516 to be communicatively coupled to the wireless network 521, for example. The 3D printer 516 further includes a transmitter 542, a receiver 543 for receiving data from the design system 520 relative to a user-specific smart ring profile, for example, and a display 544, which may include or be separate from the user-input 540.

Each of the processors 524, 531, and 538 may be a general processor, a digital signal processor, ASIC, field programmable gate array, graphics processing unit, analog circuit, digital circuit, or any other known or later developed processor. The processor 524 of the scanning device 514 may operate pursuant to a profile stored in the memory 525 of the scanning device 514, for example. The memory 525, 532, 539 may be a volatile memory or a non-volatile memory. The memory 525, 532, 539 may include one or more of a read-only memory ("ROM"), random-access memory ("RAM"), a flash memory, an electronic erasable program read-only memory ("EEPROM"), or other type of memory. The memory 525, 532, 539 may include an optical, magnetic (hard drive), or any other form of data storage.

In one example, the user-specific smart ring design protocol is part of the user-specific design profile stored on the memory 532, 539 and includes a set of executable instructions that controls the 3D printer 516 to print the user-specific smart ring. The user-specific smart ring design protocol may be stored on the memory 532, 539 as computing logic, which includes one or more routines and/or sub-routines, embodied as computer-readable instructions stored on the memory 532, 539. The processor 531, 538 can execute the logic to cause the processor 531, 538 to retrieve the profile and control the 3D printer 516 in accordance with the user-specific smart ring design profile. In particular, the user-specific smart ring design protocol may specify, among other parameters, the size, shape and/or volume of the finger for the smart ring and the timing of the 3D printing.

In view of the foregoing, it will be understood that the foregoing described smart rings 205b, 205c, 205g, 305b, 305c and 305d may be manufactured according to the following method 600 of manufacture. Specifically, the method 600 is a method of manufacturing the smart ring 205b, 205c, 205g, 305b, 305c and 305d comprising creating the first part 210b, 210b1, 210b2, 310b with a flexible material by one of heat molding, such as using a heat molding system 517A, injection molding, such as using the injection molding system 517B, ink printing, such as using the ink printing system 517F, stamping, such as using the stamping system 517D, metal forming, such as using the metal forming system 517C, machining, or additive manufacturing, using for example the 3D printer 516 (FIG. 10). The method 600 further comprises creating the second part 210c, 210c1, 210c2, 310c with a flexible material and again by one of heat molding, injection molding, ink printing, stamping, metal forming, machining, or additive manufacturing and coupling the second part 210c, 210c1, 210c2, 310c to the first part 210b, 210b1, 210b2, 310b, respectively.

The method 600 further comprises coupling the pair of magnetic break-away portions 208b, 308b, 308c to first part 210, 210b, 210b1, 210b2, 310b and the second part 210c, 210c1, 210c2, 310c, such that the first magnetic break-away portions 208b1, 308b1, 308c1 are disposed adjacent to and in contact with the second magnetic break-away portions 208b2, 308b2, 308c2. The method also includes disposing one or more of the battery 120, the charging unit 130, the controller 140, the processor unit 142, the memory unit 144, the sensor unit 150, the user input unit 170 or the output unit 190 may be disposed in or on one or more of the first part 210b, 210b1, 210b2, 310b or the second part 210c, 210c1, 210c2, 310c of the body 207b, 207b1, 207b2, 307b, 307c.

Several advantages of the foregoing smart rings will be appreciated. For example, by using the aforementioned flexible material for at least part of the body of the smart rings and the at least one pair of magnetic break-away portions, the smart ring is able to be easily removed from the user, such as during any emergency situation. Further, by heat molding or additively manufacturing the foregoing smart rings, the smart rings are able to be customized to a user's exact finger, for example, creating a better fitting smart ring for user comfort and satisfaction.

Examples of Other Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

The described functions may be implemented, in whole or in part, by the devices, circuits, or routines of the system 100 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present disclosure has been described with reference to specific examples, which are intended to be illustrative only and not to be limiting of the present disclosure, it will be apparent to those of ordinary skill in the art that changes, additions or deletions may be made to the disclosed embodiments without departing from the spirit and scope of the present disclosure.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification may not be all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements may not be limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. Generally speaking, when a system or technique is described as including "a" part or "a" step, the system or technique should be read to include one or at least one part or step. Said another way, for example, a system described as including a blue widget may include multiple blue widgets in some implementations (unless the description makes clear that the system includes only one blue widget).

Throughout this specification, some of the following terms and phrases are used.

Communication Interface according to some embodiments: Some of the described devices or systems include a "communication interface" (sometimes referred to as a "network interface"). A communication interface enables the system to send information to other systems and to receive information from other systems, and may include circuitry for wired or wireless communication.

Each described communication interface or communications unit (e.g., communications unit 160) may enable the device of which it is a part to connect to components or to other computing systems or servers via any suitable network, such as a personal area network (PAN), a local area network (LAN), or a wide area network (WAN). In particular, the communication unit 160 may include circuitry for wirelessly connecting the smart ring 101 to the user device 104 or the network 105 in accordance with protocols and standards for NFC (operating in the 13.56 MHz band), RFID (operating in frequency bands of 125-134 kHz, 13.56 MHz, or 856 MHz to 960 MHz), Bluetooth (operating in a band of 2.4 to 2.485 GHz), Wi-Fi Direct (operating in a band of 2.4 GHz or 5 GHz), or any other suitable communications protocol or standard that enables wireless communication.

Communication Link according to some embodiments: A "communication link" or "link" is a pathway or medium connecting two or more nodes. A link between two end-nodes may include one or more sublinks coupled together via one or more intermediary nodes. A link may be a physical link or a logical link. A physical link is the interface or medium(s) over which information is transferred, and may be wired or wireless in nature. Examples of physicals links may include a cable with a conductor for transmission of electrical energy, a fiber optic connection for transmission of light, or a wireless electromagnetic signal that carries information via changes made to one or more properties of an electromagnetic wave(s).

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Memory and Computer-Readable Media according to some embodiments: Generally speaking, as used herein the phrase "memory" or "memory device" refers to a system or device (e.g., the memory unit 144) including computer-readable media ("CRM"). "CRM" refers to a medium or media accessible by the relevant computing system for placing, keeping, or retrieving information (e.g., data, computer-readable instructions, program modules, applications, routines, etc.). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information, and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network according to some embodiments: As used herein and unless otherwise specified, when used in the context of system(s) or device(s) that communicate information or data, the term "network" (e.g., the networks 105 and 440) refers to a collection of nodes (e.g., devices or systems configured to sending, receiving or forwarding information) and links which are connected to enable telecommunication between the nodes.

Each of the described networks may include dedicated routers responsible for directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be configured to high volume transmissions while some nodes may be configured to sending and receiving relatively little traffic over the same period of time. Additionally, the connections between nodes on a network may have different throughput capabilities and different attenuation characteristics. A fiberoptic cable, for example, may be configured to providing a bandwidth several orders of magnitude higher than a wireless link because of the difference in the inherent physical limitations of the medium. If desired, each described network may include networks or sub-networks, such as a local area network (LAN) or a wide area network (WAN).

Node according to some embodiments: Generally speaking, the term "node" refers to a connection point, redistribution point, or a communication endpoint. A node may be any device or system (e.g., a computer system) configured to sending, receiving or forwarding information. For example, end-devices or end-systems that originate or ultimately receive a message are nodes. Intermediary devices that receive and forward the message (e.g., between two end-devices) are also generally considered to be "nodes."

Processor according to some embodiments: The various operations of example methods described herein may be performed, at least partially, by one or more processors (e.g., the one or more processors in the processor unit 142). Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A smart ring comprising:
a body including a first part, a second part removably and azimuthally connected to the first part, a first pair of break-away portions disposed within the body including a first break-away portion connected to a first end of the first part and a second break-away portion connected to a first end of the second part, a second pair of break-away portions disposed within the body including a third break-away portion connected to a second end of the first part and a fourth break-away portion connected to a second end of the second part;
wherein:
the body comprises a flexible material;
at least one selected from a group consisting of a battery, a charging unit, a processor unit, a user input unit, a communication unit, a memory unit, a sensor unit, and an output unit, is disposed in or on one of the first part and the second part;
the first part of the body includes at least a part of the sensor unit;
the second part of the body includes at least a part of the output unit; and
the first break-away portion of the first pair of break-away portions is removable from the second break-away portion of the first pair of break-away portions.

2. The smart ring of claim 1, wherein the body further comprises an inside surface adapted to contact a finger of a user during use, wherein the sensor unit or the output unit is disposed on the inside surface.

3. The smart ring of claim 1, wherein at least a portion of the body comprises an electric sensor fabric material.

4. The smart ring of claim 1, wherein a portion of the body includes a silicone material adapted to function as part of one of an artificial muscle and a nerve, wherein the silicone material is configured to generate electricity or sense pressure.

5. The smart ring of claim 1, wherein the body further comprises an outside surface, wherein at least one selected from a group consisting of a sensor and an output element is disposed on the outside surface.

6. The smart ring of claim 1, wherein the first break-away portion includes a first magnet and the second break-away portion includes a second magnet.

7. The smart ring of claim 1, wherein the sensor unit includes at least one selected from a group consisting of a touch sensor, a biometric sensor, a temperature sensor, an electronic sensor, an acceleration sensor, a sound sensor, and a light sensor.

8. The smart ring of claim 1, further comprising a housing, wherein the at least one selected from a group consisting of the battery, the charging unit, the processing unit, the user input unit, the communication unit, the memory unit, the sensor unit, and the output unit is disposed within the housing, and the body is coupled to the housing.

9. The smart ring of claim 1, wherein the processor unit or the output unit is coupled to an output device, the output device including a display or a speaker.

10. The smart ring of claim 1, where the first part of the body is a front part of the body including a recess, and the second part of the body is a rear part of the body including a tab adapted to be disposed within the recess when the first part of the body and the second part of the body are connected to each other, and the first break-away portion is disposed adjacent to the recess and the second break-away portion is disposed on or attached to the tab, such that the first break-away portion and the second break-away portion are adjacent to each other when the tab is disposed within the recess.

11. The smart ring of claim 1, where the first part of the body is a top body part, and the second part of the body is a bottom body part, and the first break-away portion is attached to the top body part, and the second break-away portion is attached to the bottom body part, such that the first break-away portion and the second break-away portion are adjacent to and in contact with each other when the bottom body part is connected to the top body part.

12. A method of manufacturing a smart ring, the method comprising:
creating a first part of a body with a flexible material by a process being at least one process selected from a group consisting of heat molding, injection molding, ink printing, stamping, metal forming, machining, and additive manufacturing;
creating a second part of the body with a flexible material by the process, the second part configured to azimuthally connect to the first part;
providing a first pair of break-away portions including a first break-away portion and a second break-away portion, the first break-away portion being removable from the second break-away portion;
providing a second pair of break-away portions including a third break-away portion and a fourth break-away portion;
coupling the first break-away portion to a first end of the first part and the third break-away portion to a second end of the first part;
coupling the second break-away portion to a first end of the second part and the fourth break-away portion to a second end of the second part; and
disposing at least one selected from a group consisting of a battery, a charging unit, a processor unit, a user input unit, a communication unit, a memory unit, a sensor unit, and an output unit, in or on one of the first part of the body, the second part of the body;
wherein:
the first part of the body includes at least a part of the sensor unit; and
the second part of the body includes at least a part of the output unit.

13. The method of claim 12, wherein the first pair of break-way portions include a pair of magnetic break-away portions.

14. The method of claim 12, further comprising disposing a sensor or an output element on an inside surface of the body.

15. The method of claim 12, further comprising disposing a sensor or an output element on an outside surface of the body.

16. The method of claim 15, wherein the output element includes at least one selected from a group consisting of an LCD display, an OLEO display, one or more e-ink displays, one or more LED pixels, and a speaker.

17. A system for additively manufacturing a smart ring, the system comprising:
a communication network;
a scanning device communicatively coupled to the communication network and includes:
a memory configured to store a scanning module, and
at least one processor configured to execute the scanning module to create a user-specific scan; and
a computing device communicatively coupled to the communication network, the scanning device, and a 3D printer, the computing device having a memory, at least one processor, a transmitter, and a receiver;
wherein when a module stored in the memory of the computing device is executed by the at least one processor of the computing device, the computing device is configured to:
receive data from the scanning device relating to the user-specific scan; and
create a user-specific smart ring profile based at least in part on the data received from the scanning device, the user-specific smart ring profile adapted to be transmitted to the 3D printer to implement the user-specific smart ring profile;
wherein the 3D printer is configured to receive the user-specific smart ring profile from the computing device and implement the user-specific smart ring profile to additively manufacture a smart ring comprising a body including a first part, a second part removably and azimuthally connected to the first part, a first pair of break-away portions disposed within the body including a first break-away portion connected to a first end of the first part and a second break-away portion connected to a second end of the second part, and a second pair of break-away portions disposed within the body including a third break-away portion connected to a first end of the first part and a fourth break-away portion connected to a second end of the second part, the body comprises a flexible material;
wherein:
the first part of the body includes at least a part of a sensor unit; and
the second part of the body includes at least a part of an output unit.

18. The system of claim 17, wherein the body further comprises an inside surface adapted to contact a finger of a user during use, wherein at least one selected from a group consisting of a sensor and an output element is disposed on the inside surface.

19. The system of claim 17, wherein the at least a portion of the body comprises an electric sensor fabric material.

20. The system of claim 17, where the scanning device includes a volumetric capture sensor.

* * * * *